United States Patent
Ichiba

(10) Patent No.: US 10,970,056 B2
(45) Date of Patent: Apr. 6, 2021

(54) COMPILER AND INFORMATION PROCESSING METHOD FOR DELETING SPILL INSTRUCTIONS

(71) Applicant: FUJITSU LIMITED, Kawasaki (JP)

(72) Inventor: Toshiyuki Ichiba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/774,019

(22) Filed: Jan. 28, 2020

(65) Prior Publication Data
US 2020/0272442 A1    Aug. 27, 2020

(30) Foreign Application Priority Data

Feb. 25, 2019  (JP) .............................. JP2019-032032

(51) Int. Cl.
*G06F 8/41*     (2018.01)

(52) U.S. Cl.
CPC ............ *G06F 8/441* (2013.01); *G06F 8/4441* (2013.01)

(58) Field of Classification Search
CPC ........ G06F 8/441; G06F 8/443; G06F 8/4441; G06F 9/3012; G06F 9/30101
USPC ................................................ 717/140–161
See application file for complete search history.

(56) References Cited

U.S. PATENT DOCUMENTS

| | | | |
|---|---|---|---|
| 6,738,966 B1* | 5/2004 | Tanaka | G06F 8/441 717/136 |
| 2005/0050533 A1* | 3/2005 | Koseki | G06F 8/441 717/158 |
| 2005/0071832 A1 | 3/2005 | Kawahito | |

FOREIGN PATENT DOCUMENTS

| | | |
|---|---|---|
| JP | 2002-312179 A | 10/2002 |
| JP | 2005-107816 A | 4/2005 |

OTHER PUBLICATIONS

Harvey, T., "Reducing the Impact of Spill Code", Rice University [online], 1998 [retrieved Sep. 28, 2020], Retrieved from Internet: <URL: https://www.cs.rice.edu/~keith/EMBED/harveyms.pdf>, whole document.*

* cited by examiner

*Primary Examiner* — Todd Aguilera
(74) *Attorney, Agent, or Firm* — Fujitsu Patent Center

(57) ABSTRACT

A compiler device includes: a processor configured to: when a first register is allocated to first and second spill instructions, which refer to same data in a memory, of an instruction sequence and to a first section between the first and second spill instructions, search for a second register that is a candidate allocated to the first section instead of the first register; when a second section allocated with the second register and the first section do not overlap, allocate the second register to the first section instead of the first register; when the first and second sections overlap, allocate a third register to the second section instead of the second register, and then allocate the second register to the first section instead of the first register; and thereafter, delete an instruction executed later than the other instruction of the first and second spill instructions.

6 Claims, 26 Drawing Sheets

COMPILER AND INFORMATION PROCESSING METHOD FOR DELETING SPILL INSTRUCTIONS

CROSS-REFERENCE TO RELATED APPLICATION

This application is based upon and claims the benefit of priority of the prior Japanese Patent Application No. 2019-032032, filed on Feb. 25, 2019, the entire contents of which are incorporated herein by reference.

FIELD

A certain aspect of embodiments described herein relates to a compiler device, a non-transitory computer-readable medium, and an information processing method.

BACKGROUND

One of compiler optimization techniques for improving the execution speed of a program is register allocation. Register allocation is a technique for reducing memory access during program execution by transferring data in a memory to registers in advance. Since register access is faster than memory access, register allocation improves the execution speed of a program. Note that the techniques related to the present disclosure is also disclosed in Japanese Laid-open Patent Publications Nos. 2005-107816 and 2002-312179.

SUMMARY

According to an aspect of the embodiments, there is provided a compiler device comprising: a first memory; and a processor coupled to the first memory and configured to: obtain an instruction sequence including a first spill instruction and a second spill instruction, where the first spill instruction and the second spill instruction refer to same data in a second memory; when a first register is allocated to the first spill instruction and the second spill instruction, and the first register is allocated to a first section between the first spill instruction and the second spill instruction, search for a second register that is a candidate allocated to the first section instead of the first register; allocate the second register to the first section instead of the first register when the first section and a second section to which the second register is allocated in the instruction sequence do not overlap; after allocating a third register to the second section instead of the second register, allocate the second register to the first section instead of the first register when the first section and the second section overlap; and after allocating the second register to the first section instead of the first register, delete an instruction executed later than the other instruction of the first spill instruction and the second spill instruction.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Embodiment

As noted above, register allocation can improve the execution speed of the program. However, since the number of registers is finite, data that cannot be stored in the registers needs to be spilled out from the registers into the memory by a spill-out instruction. When the data spilled out into the memory becomes necessary in executing the program, a spill-in instruction for transferring the data to the register again needs to be executed. Spill instructions such as spill-out instructions and spill-in instructions are memory reference instructions embodied by store instructions and load instructions, respectively. Therefore, spill instructions require longer memory access time, which in turn lower the execution speed of the program. In the following, embodiment capable of improving the execution speed of the program will be described.

Figure 1:
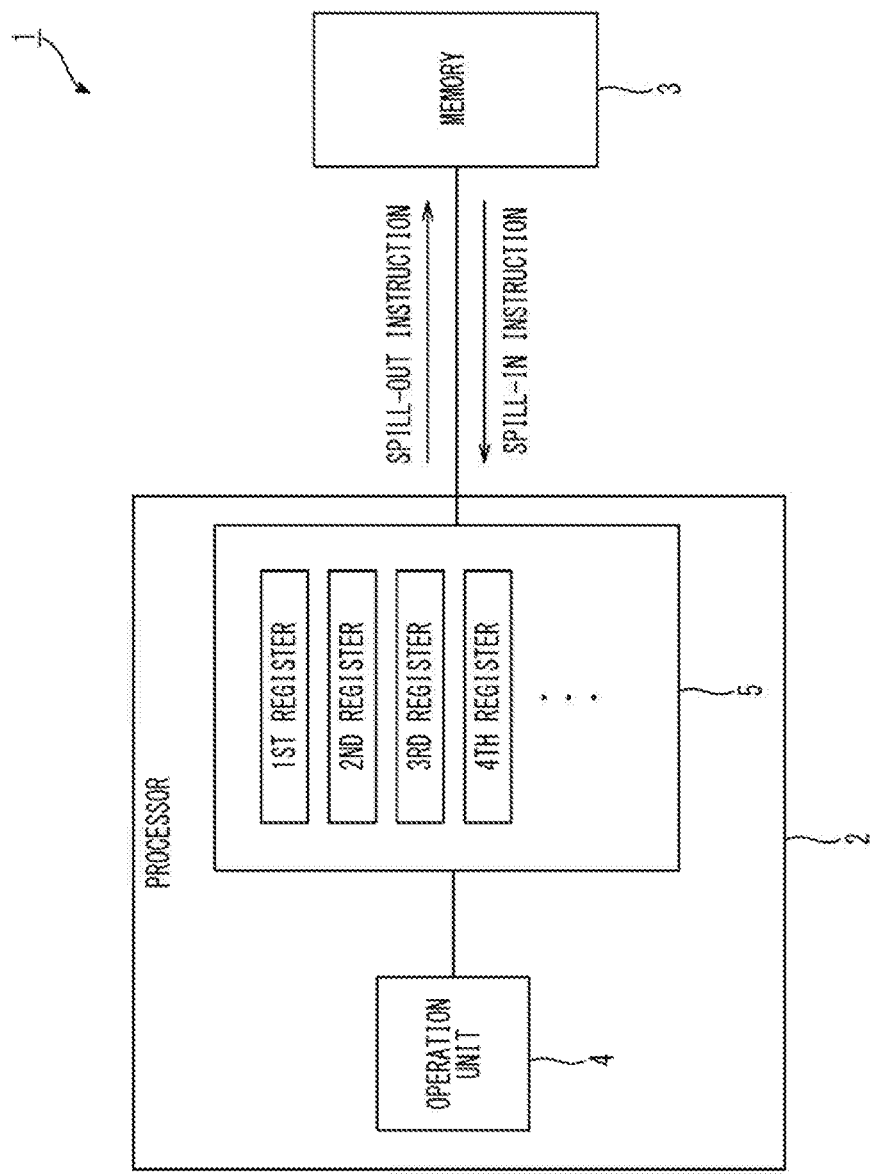
FIG. 1 is a hardware configuration diagram of a target machine in accordance with an embodiment.

FIG. 1 is a hardware configuration diagram of a target machine in accordance with an embodiment.

A target machine 1 is a computing machinery such as a server or a personal computer (PC), and includes a processor 2 and a memory 3.

The processor 2 includes a register file 5 and an operation unit 4 such as an arithmetic and logic unit (ALU), which performs arithmetic operations and logical operations. The register file 5 is a device including a plurality of registers. In this example, the registers are numbered in the order of No. 1, No. 2, . . . .

The memory 3 is a volatile memory such as a dynamic random access memory (DRAM) to which various programs are expanded.

When a program is executed in the target machine 1, the execution speed of the program is improved by transferring data in the memory 3 to the register file 5 in advance by a spill-in instruction. Moreover, during program execution, the data may be spilled out from the register file 5 to the memory 3 by a spill-out instruction.

An instruction sequence executed in the target machine 1 is output when a compiler compiles a source code.

Figure 2:
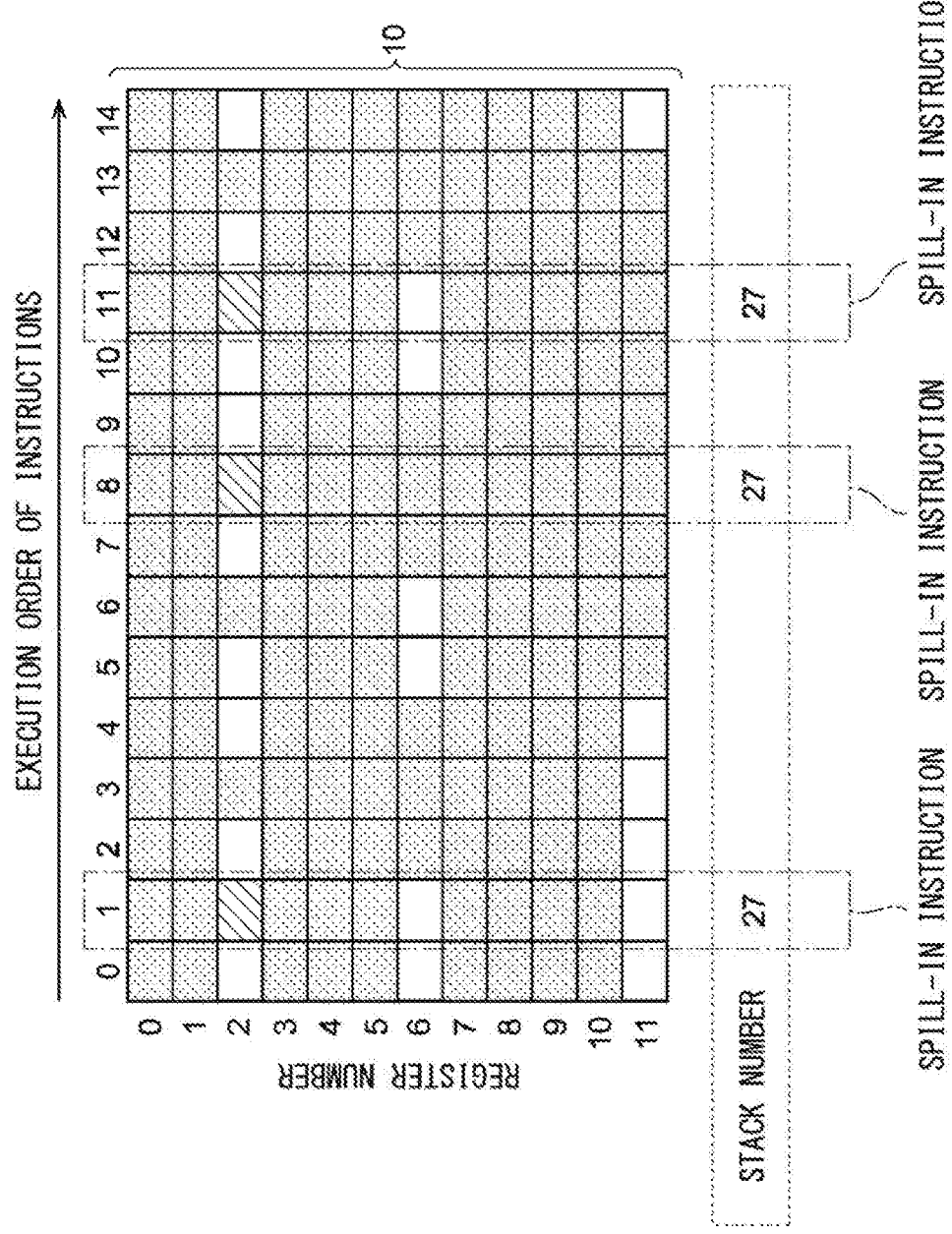
FIG. 2 is a diagram schematically illustrating instructions and register allocations in a basic block in the embodiment.

FIG. 2 is a diagram schematically illustrating instructions and register allocations in a basic block 10 output by the compiler. The basic block 10 is an instruction sequence in which instructions other than branch instructions are arranged in execution order, and the instructions are executed in the order from No. 0 to No. 14.

The registers are arranged in ascending order of the register numbers from top to bottom. Note that the registers already allocated to the instructions are indicated by hatching with slant lines or dots. Here, the register already allocated to the instruction means a register to which data used by the instruction is already allocated. The register to which data to be transferred by a spill instruction is allocated is indicated by hatching with slant lines, and the register to which data that is not transferred by a spill instruction is allocated is indicated by hatching with dots. Then, a free register that is not allocated to data used by the instruction is indicated by white.

In this example, the 1st instruction, the 8th instruction, and the 11th instruction are spill-in instructions. The data to be transferred to a register by a spill-in instruction is managed in a stack region in the memory 3. Stack numbers are assigned to respective data in the stack region, and the data is identified by the stack number. Each spill-in instruction described above is a load instruction that transfers data having a stack number of 27 to the 2nd register.

To reduce memory access, it is preferable to reduce the number of spill-in instructions as much as possible. However, in this example, after the 1st spill-in instruction is executed, the 2nd register is allocated to each of the 3rd instruction and the 6th instruction. Thus, these instructions may rewrite the contents of the 2nd register. Therefore, the 8th spill-in instruction needs to be executed again after execution of the 3rd instruction and the 6th instruction is completed. In addition, since the compiler optimization is insufficient, the 11th spill-in instruction is unnecessarily included in the instruction sequence.

To improve the execution speed of the program, the 8th and 11th spill-in instructions may be deleted. To this end, the register allocated to each of the 3rd instruction and the 6th instruction is changed from the 2nd register to other registers, and the 2nd register is not allocated both in a section [2, 7] and a section [9, 10]. Note that the section [2, 10] represents the section starting from the 2nd instruction and ending with the 10th instruction. In the same manner, hereinafter, the section starting from the i-th instruction and ending with the j-th instruction is represented by a section [i, j]. In the following, a method of changing the register allocations will be described.

Different methods are used for changing the register allocations depending on whether the register to be newly allocated is free. Therefore, in the first example, change method of register allocation is firstly explained, where the register to be newly allocated is free.

First Example

FIG. 3 through FIG. 7 are diagrams schematically illustrating a method of changing register allocations in accordance with the first example of the present embodiment.

Hereinafter, a case where registers are allocated as illustrated in FIG. 2 will be described as an example.

Figure 3:
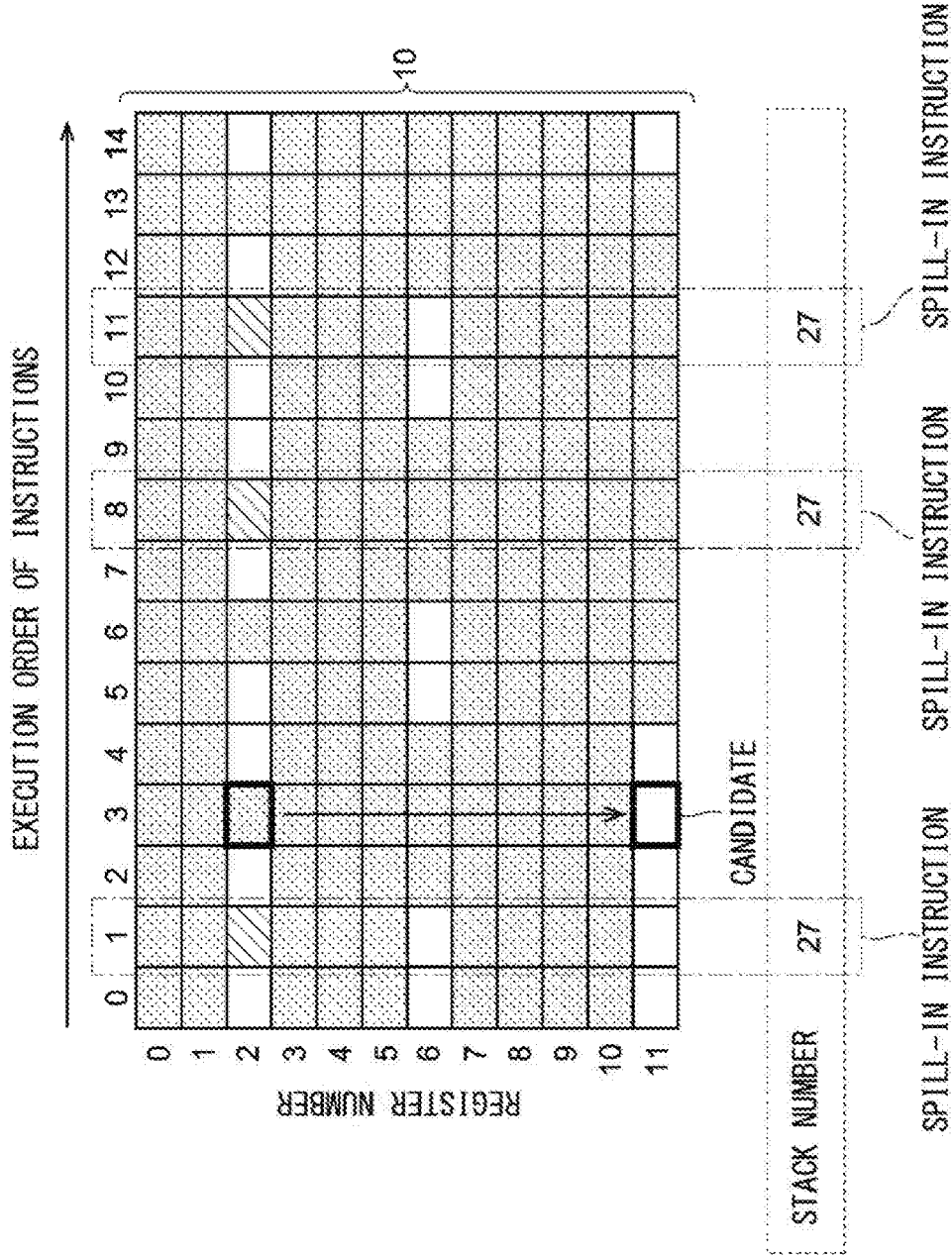
FIG. 3 is a diagram (No. 1) schematically illustrating an overview of a method of changing register allocations in accordance with a first example of the embodiment.

First, as illustrated in FIG. 3, a candidate register is searched for in the section [3, 3]. The candidate register is the register that is newly allocated instead of the second register. In this example, the 11th register is free in the section [3, 3]. Therefore, the 11th register is determined as the candidate of newly allocated register in the section [3, 3] instead of the 2nd register. Hereinafter, the registers subjected to the allocation change are indicted by bold black frames.

Figure 4:
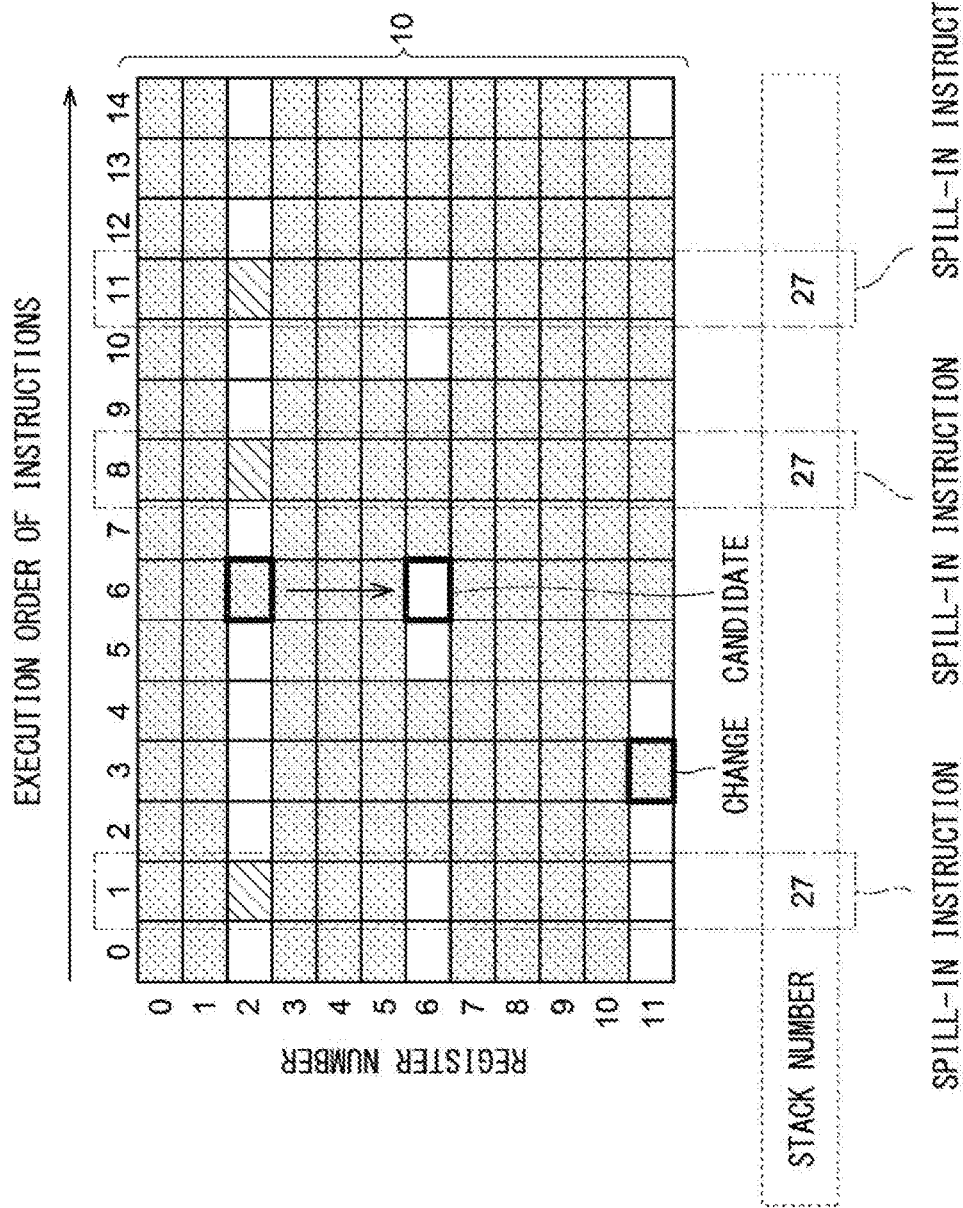
FIG. 4 is a diagram (No. 2) schematically illustrating the overview of the method of changing the register allocations in accordance with the first example of the embodiment.

Next, as illustrated in FIG. 4, 11th register is newly allocated in the section [3, 3] instead of the 2nd register.

Then, the same search as described above is also executed with respect to the 2nd register allocated to the section [6, 6]. The register that is free in the section [6, 6] is the 6th register. Thus, in this example, the 6th register is determined as a candidate of newly allocated register in the section [6, 6] instead of the 2nd register.

Figure 5:
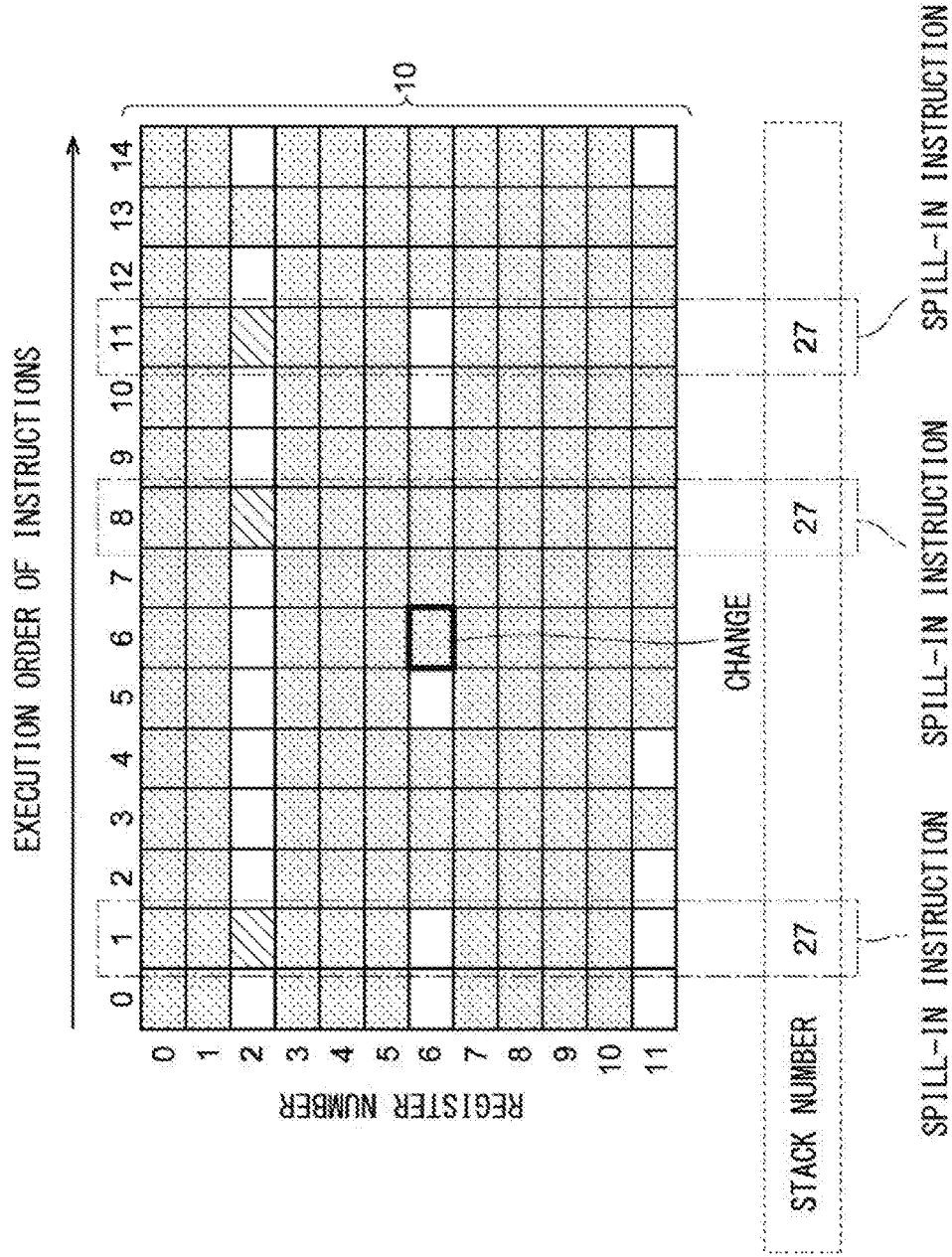
FIG. 5 is a diagram (No. 3) schematically illustrating the overview of the method of changing the register allocations in accordance with the first example of the embodiment.

Then, as illustrated in FIG. 5, the register allocation in the section [6, 6] is changed so that the 6th register is newly allocated instead of the 2nd register.

Figure 6:
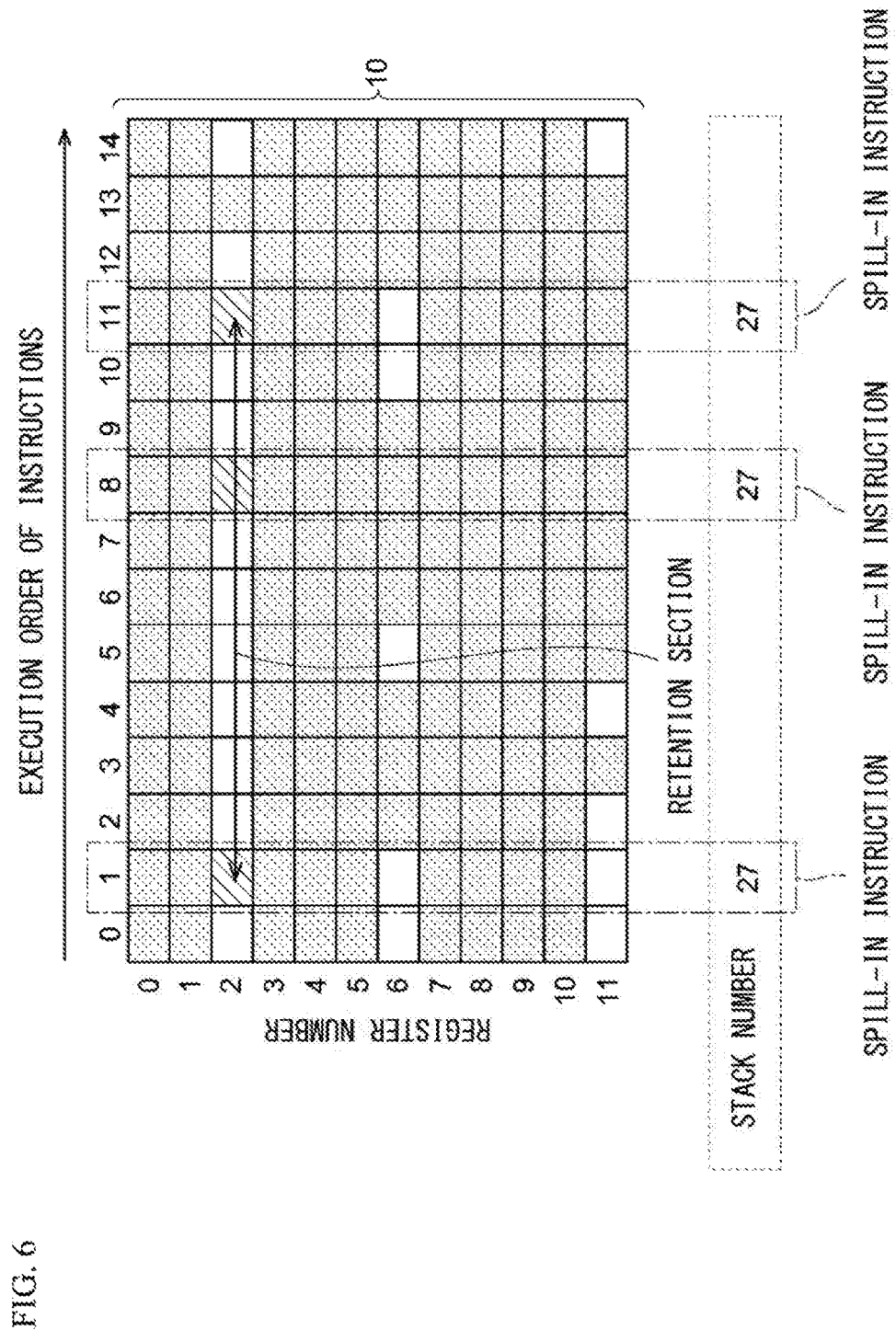
FIG. 6 is a diagram (No. 4) schematically illustrating the overview of the method of changing the register allocations in accordance with the first example of the embodiment.

Accordingly, as illustrated in FIG. 6, the retention section in which the data in the 2nd register allocated to the 1st spill-in instruction is retained without being rewritten is extended to the 11th instruction. Therefore, even when the 8th spill-in instruction is deleted, the data stored in the 2nd register by the 1st spill-in instruction is not changed until the 11th instruction.

Figure 7:
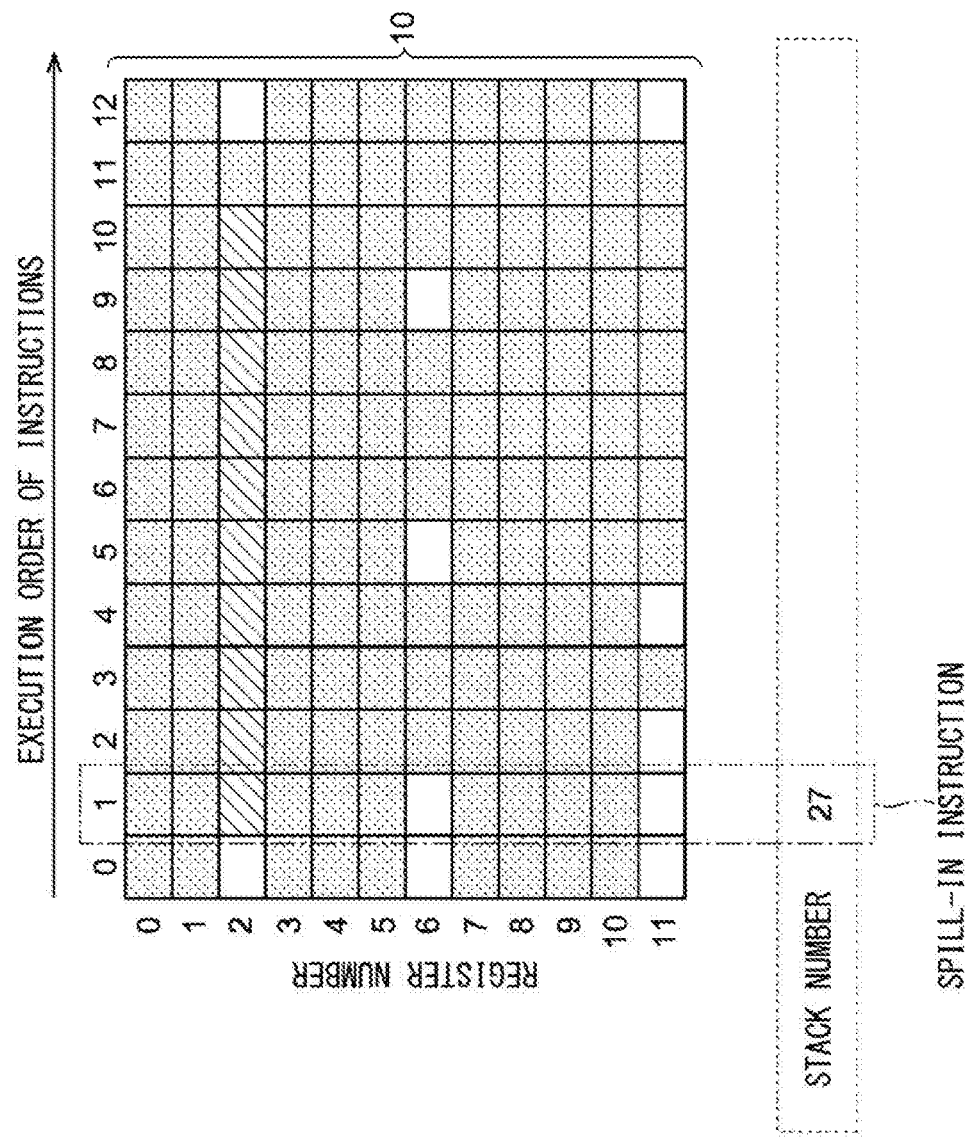
FIG. 7 is a diagram (No. 5) schematically illustrating the overview of the method of changing the register allocations in accordance with the first example of the embodiment.

Thus, as illustrated in FIG. 7, the unnecessary 8th spill-in instruction is deleted. Moreover, the unnecessary 11th spill-in instruction attributed to the insufficient compiler optimization is also deleted here.

As a result, the number of spill-in instructions that need memory access becomes only one, and the instruction sequence in the basic block 10 becomes short. Therefore, the execution speed of the program is improved. Note in FIG. 7 that hatching with slant lines indicates the section in which data allocated to the 1st spill-in instruction is retained As described above, when a register allocated to a section between two spill instructions is identical to the register used by these two spill instructions, and another register is free in the section between the two spill instructions, the allocation can be changed between the register allocated to the section and the register that is free. Thus, even when one of the two spill instructions that is executed later than the other is deleted, the execution result of the program does not change, and the execution speed of the program is improved by deletion of the spill instruction.

However, when the section to be newly allocated with the register overlaps with the section allocated with the register before the allocation is changed, it is impossible to change the allocation by the above-described method. Therefore, in the followings, a method of changing register allocations will be described for the case where the sections allocated with the respective register overlap.

Second Example

FIGS. 8 to 16 are diagrams schematically illustrating a method of changing register allocations in accordance with a second example of the present embodiment.

Figure 8:
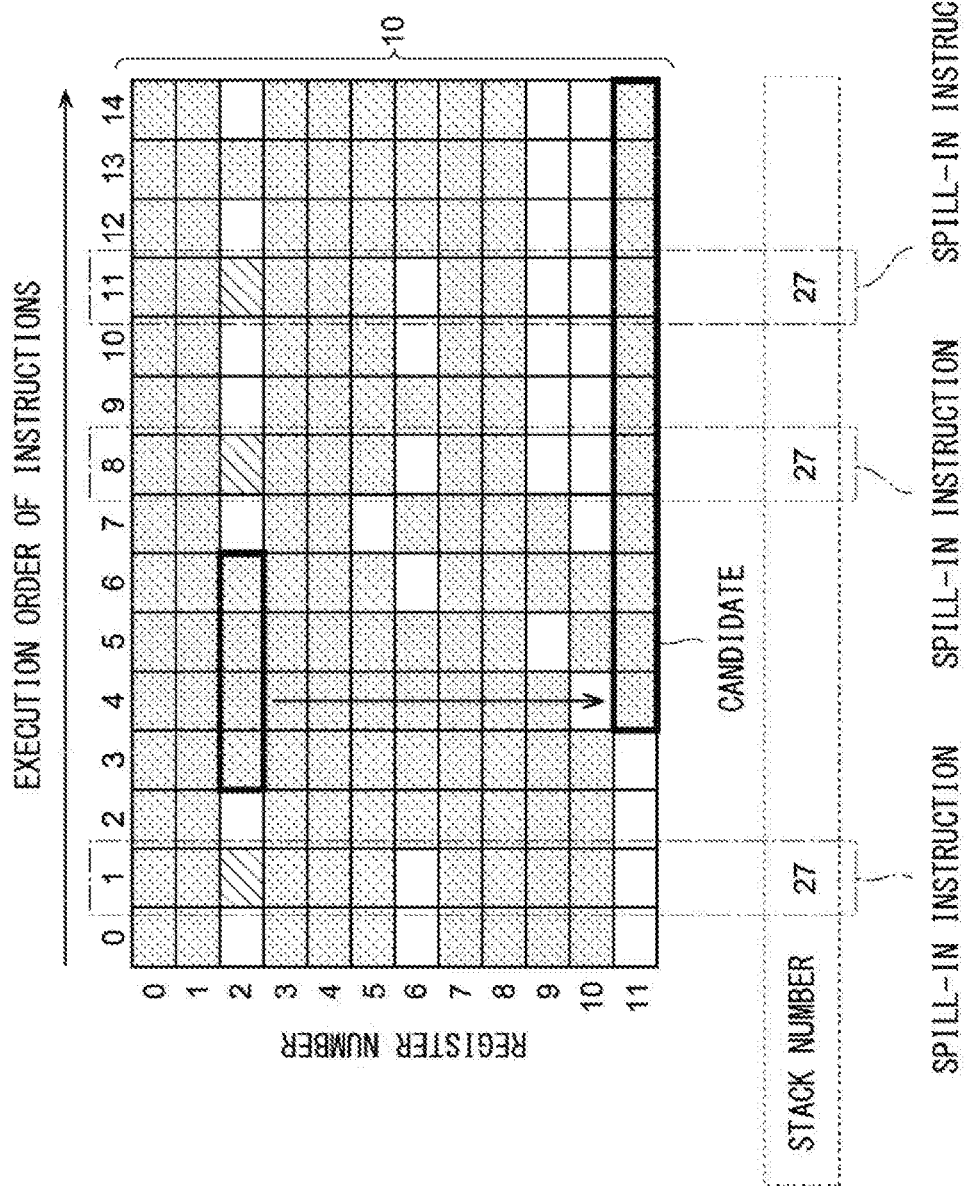
FIG. 8 is a diagram (No. 1) schematically illustrating an overview of a method of changing register allocations in accordance with a second example of the embodiment.

In the example of FIG. 8, as in the example of FIG. 3, the 1st, 8th, and 11th instructions are spill-in instructions that transfer data having a stack number of 27 in the memory 3 to the 2nd register. However, the 2nd register is allocated to the section [3, 6], and the section to which the 2nd register is allocated is longer than those in FIG. 3.

In this case, a register that is free at the starting point of the section [3, 6] is searched for. In this example, the 11th register is free at the starting point of the section [3, 6]. Thus, the 11th register is determined as a candidate of newly allocated register instead of the 2nd register.

However, the section allocated with the 11th register is [4, 14], which overlaps with the section [3, 6] allocated with the 2nd register. Thus, it is impossible in the section [3, 6] to change the allocation from the 2nd register to the 11th register.

Figure 9:
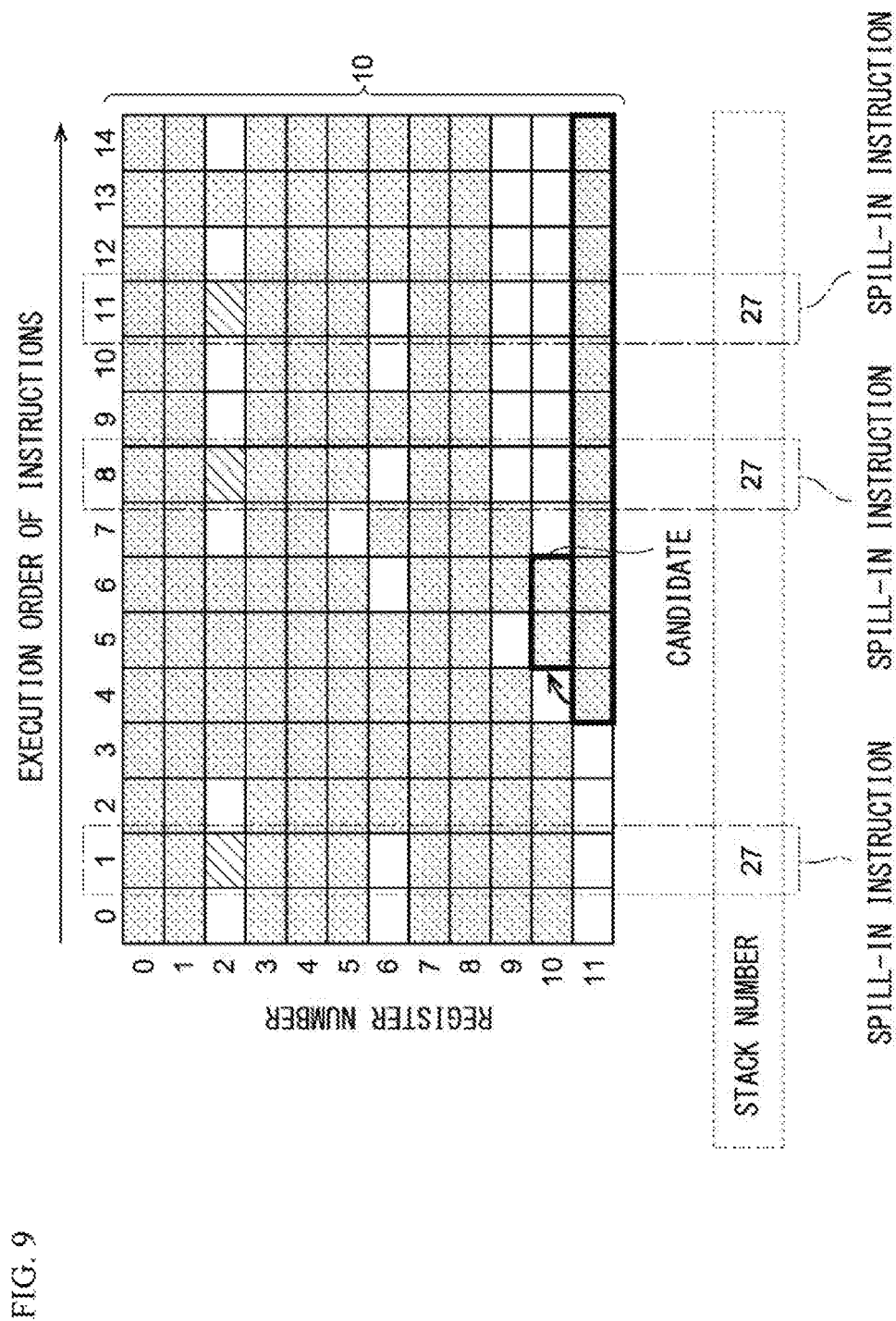
FIG. 9 is a diagram (No. 2) schematically illustrating the overview of the method of changing the register allocations in accordance with the second example of the embodiment.

Therefore, as illustrated in FIG. 9, in order to change the allocation in the section [4, 14] in such a manner that another register is newly allocated instead of the 11th register, a candidate of newly allocated register is searched for. Here, the 10th register that is free at the starting point of the section [4, 14] is determined as a candidate to which the allocation is to be changed.

However, the section allocated with the 10th register is [5, 6], which overlaps with the section [4, 14] allocated with the 11th register. Thus, it is impossible in the section [4, 14] to change the allocation from the 11th register to the 10th register.

Figure 10:
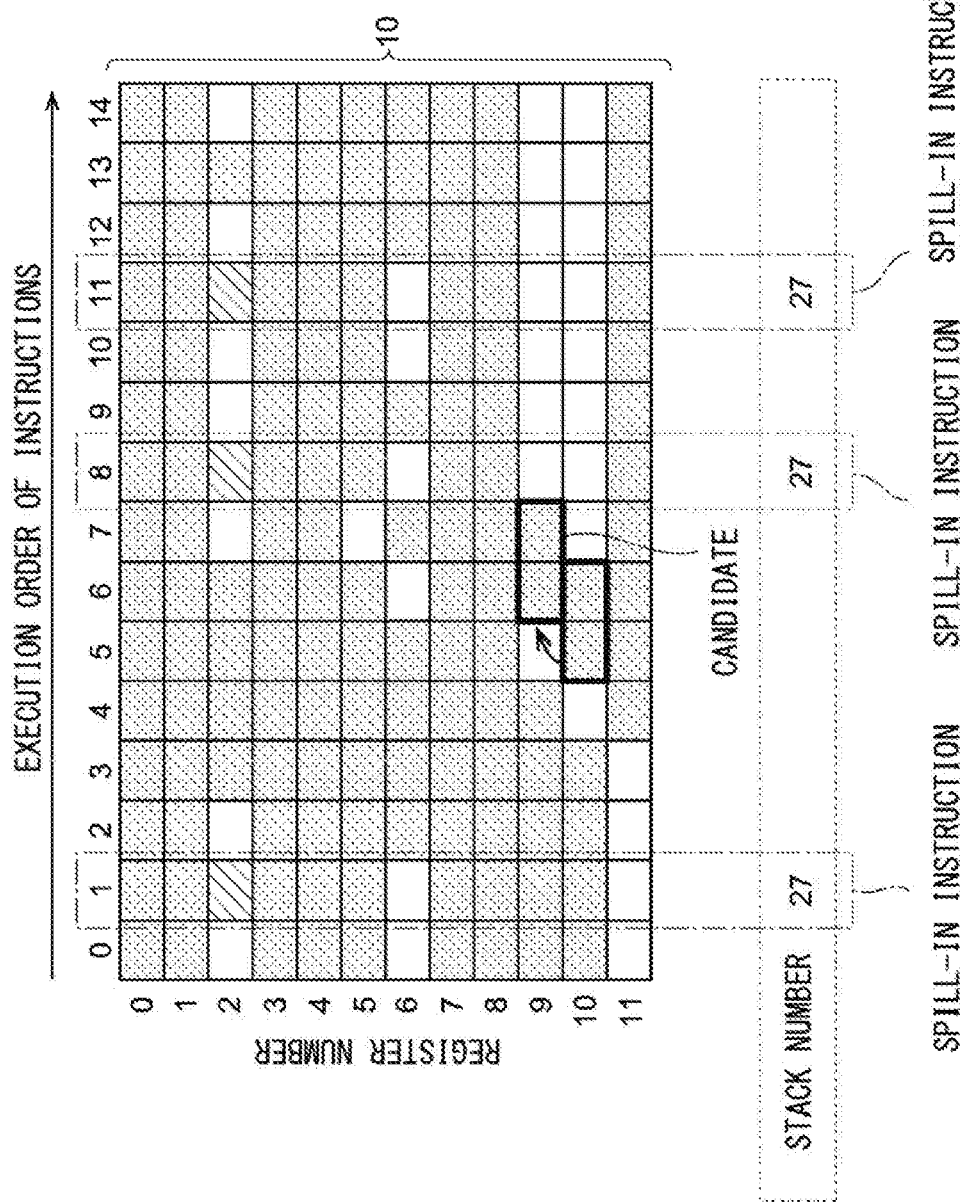
FIG. 10 is a diagram (No. 3) schematically illustrating the overview of the method of changing the register allocations in accordance with the second example of the embodiment.
Figure 11:
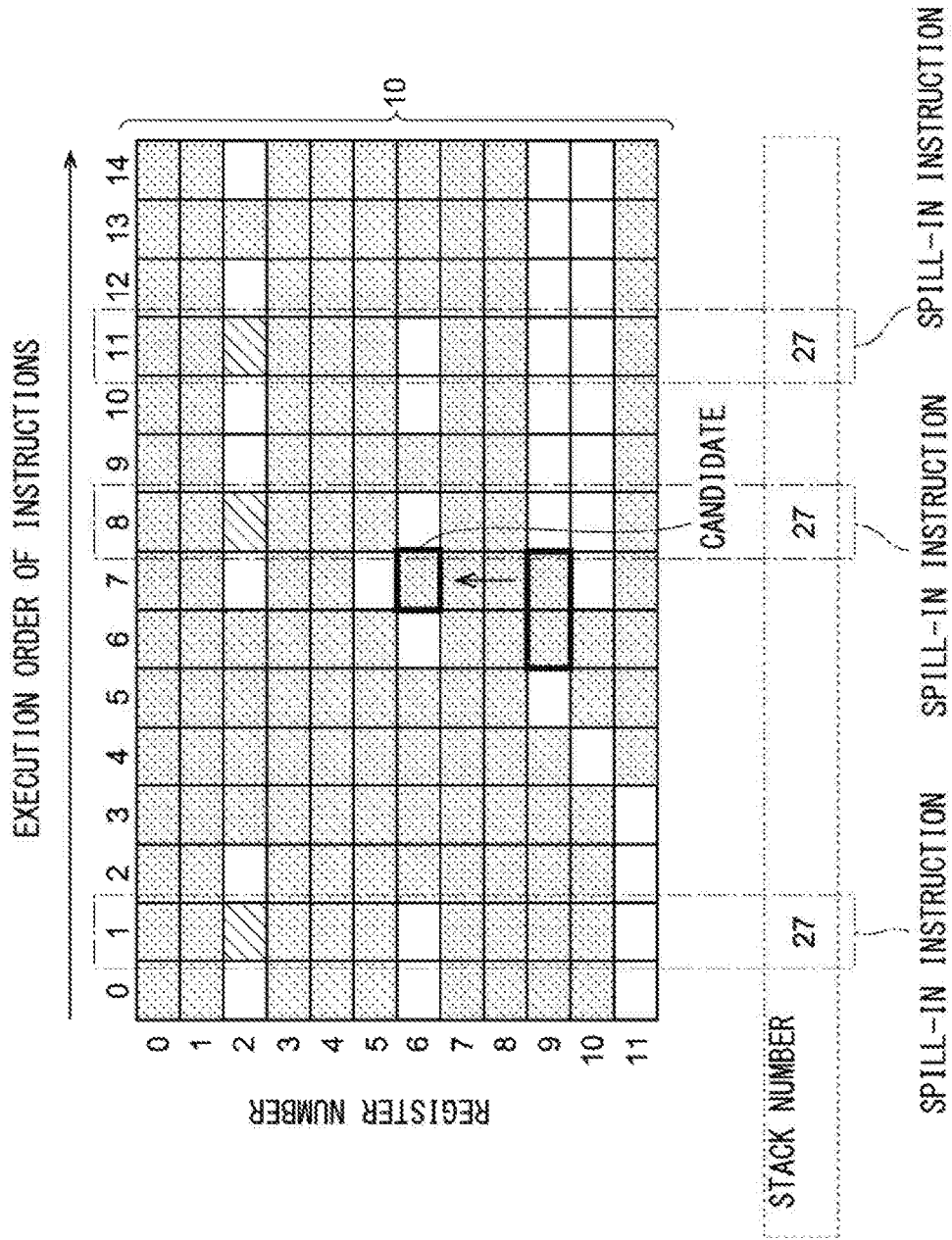
FIG. 11 is a diagram (No. 4) schematically illustrating the overview of the method of changing the register allocations in accordance with the second example of the embodiment.

Therefore, as illustrated in FIG. 10, in order to change the allocation in the section [5, 6] in such a manner that another register is newly allocated instead of the 10th register, a candidate of newly allocated register is searched for. Here, the 9th register that is free at the starting point of the section [5, 6] is determined as the candidate.

However, the section allocated with the 9th register is [6, 7], which overlaps with the section [5, 6] allocated with the 10th register. Thus, it is impossible in the section [5, 6] to change the allocation from the 10th register to the 9th register.

Thus, in order to further change the allocation in the section [6, 7] in such a manner that another register is newly allocated instead of the 9th register, a candidate of newly allocated register is searched for. In the same manner as described above, the 6th register that is free at the starting point of the section [6, 7] is determined as the candidate.

However, the section allocated with the 6th register is [7, 7], which overlaps with the section [6, 7] allocated with the 9th register. Thus, it is impossible in the section [6, 7] to change the allocation from the 9th register to the 6th register.

Therefore, in order to further change the allocation in the section [7, 7] in such a manner that another register is newly allocated instead of the 6th register, a candidate of newly allocated register is searched for. Here, except for the 2nd register that was firstly subjected to the searching of the candidate to which the allocation is changed from the 2nd register, the 5th register that is free at the starting point of the section [7, 7] is determined as the candidate.

This time, the 5th register is free in the entire section of the section [7, 7]. Thus, the allocation in the section [7, 7] can be changed from the 6th register to the 5th register.

Figure 13:
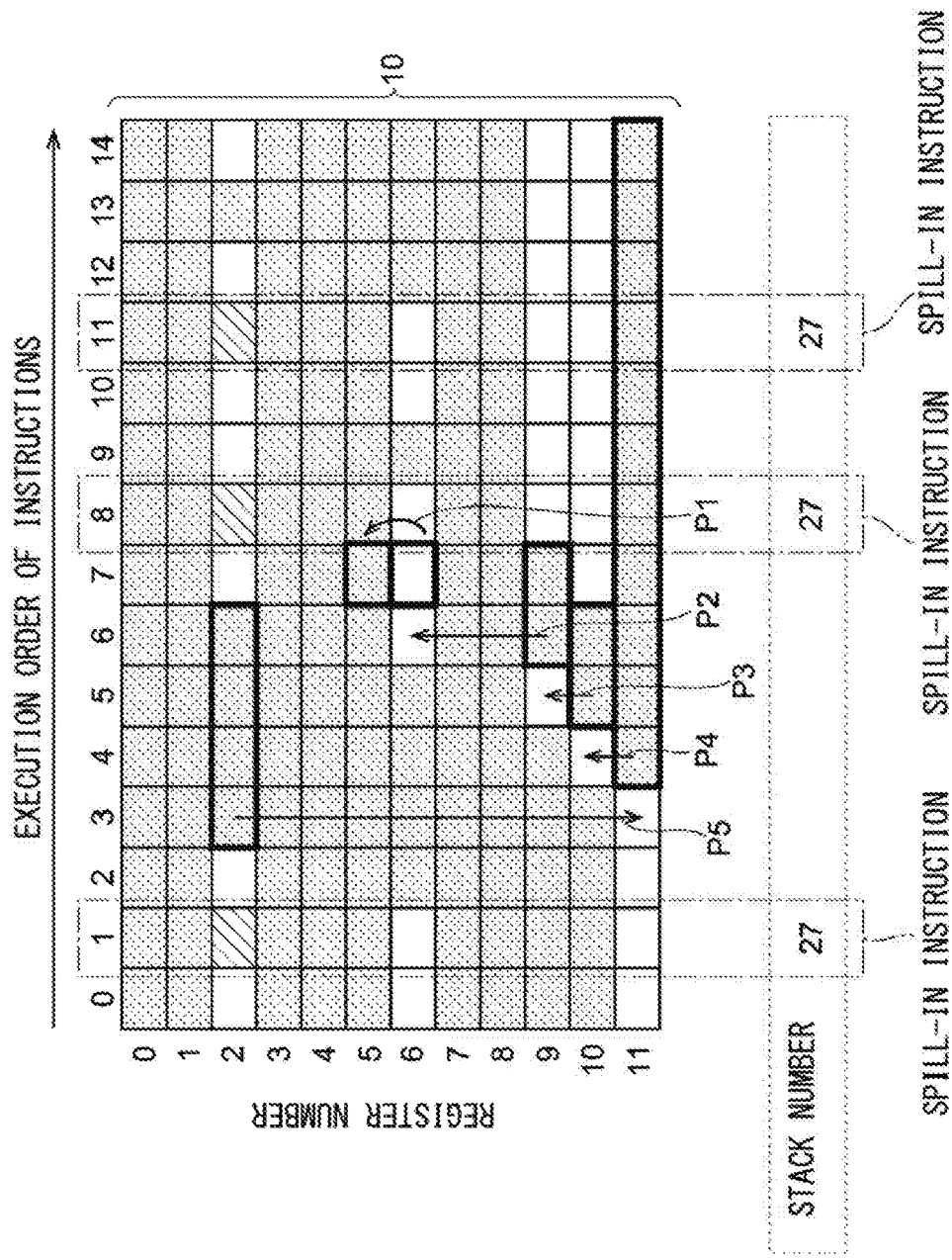
FIG. 13 is a diagram (No. 6) schematically illustrating the overview of the method of changing the register allocations in accordance with the second example of the embodiment.

Thus, as illustrated in FIG. 13, the allocation in the section [7, 7] is changed from the 6th register to the 5th register (step P1). Therefore, the 6th register becomes free in the entire section of the section [6, 7], and the allocation in the section [6, 7] is changed from the 9th register to the 6th register (step P2). As a result, the 9th register becomes free in the entire section of the section [5, 6], and the allocation in the section [5, 6] is changed from the 10th registers to the 9th register (step P3).

In the same manner, the allocation in the section [4, 14] is changed from the 11th register to the 10th registers (step P4), and finally, the allocation in the section [3, 6] is changed from the 2nd register to the 11th register (step P5).

Figure 14:
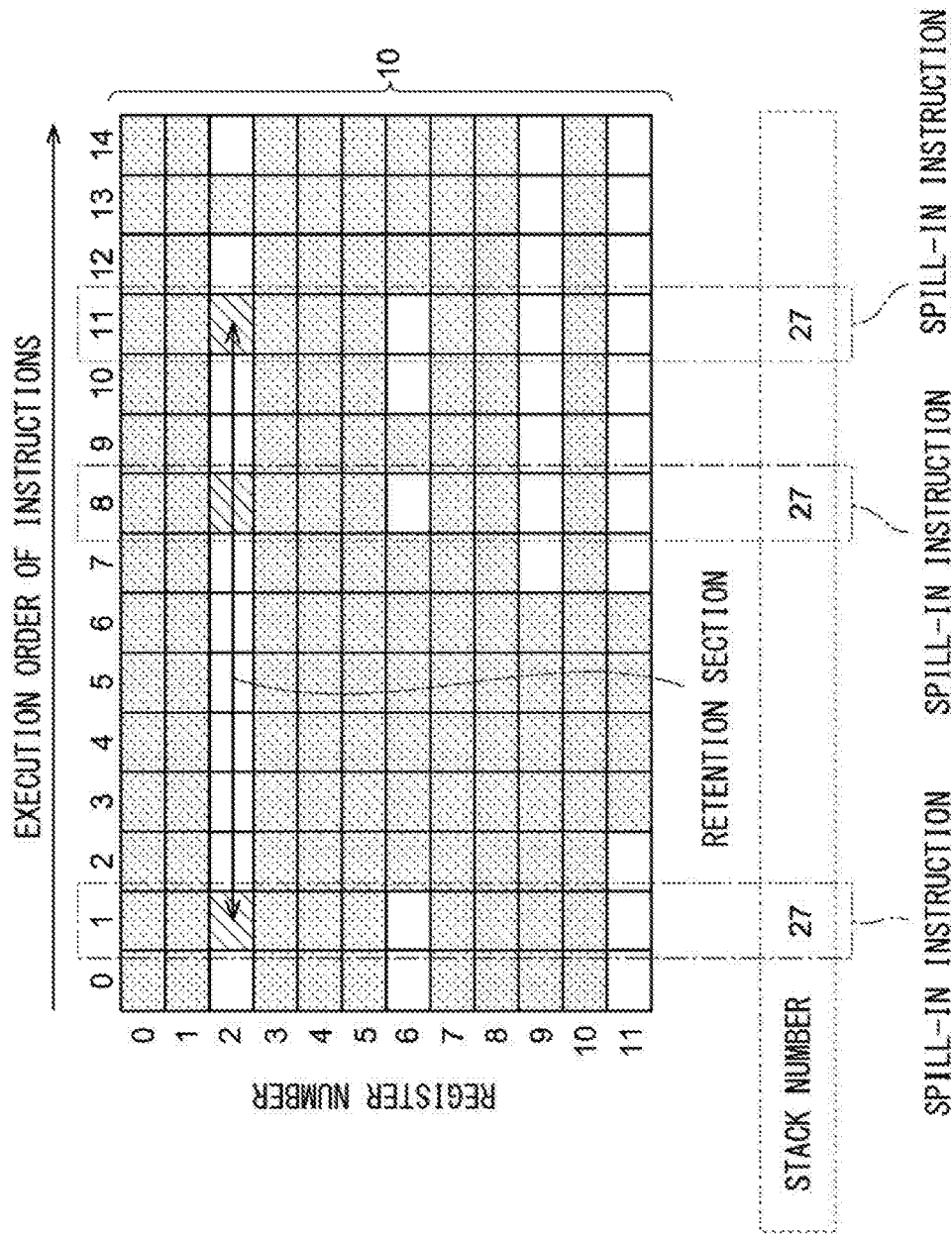
FIG. 14 is a diagram (No. 7) schematically illustrating the overview of the method of changing the register allocations in accordance with the second example of the embodiment.

Through the above steps, as illustrated in FIG. 14, the retention section in which the data transferred to the 2nd register by the 1st spill-in instruction is retained becomes the section [1, 11], and the 8th and 11th spill-in instructions become included in the section [1, 11]. Thus, as in the first example, the 8th and 11th spill-in instructions can be deleted, and the execution speed of the program is improved.

In this example, the contents of the 11th register is moved to the 10th register by change in the register allocations, and this state is maintained until the 14th instruction at the end of the basic block 10. The accuracy of the execution result of the program is ensured by unifying the register allocations between the last instruction of a basic block and the first instruction of the subsequent basic block among a plurality of basic blocks. For example, when the register allocated to the last instruction of a basic block is not allocated to the first instruction of the subsequent basic block, the subsequent basic block is executed using data different from the data that should originally be used.

Figure 15:
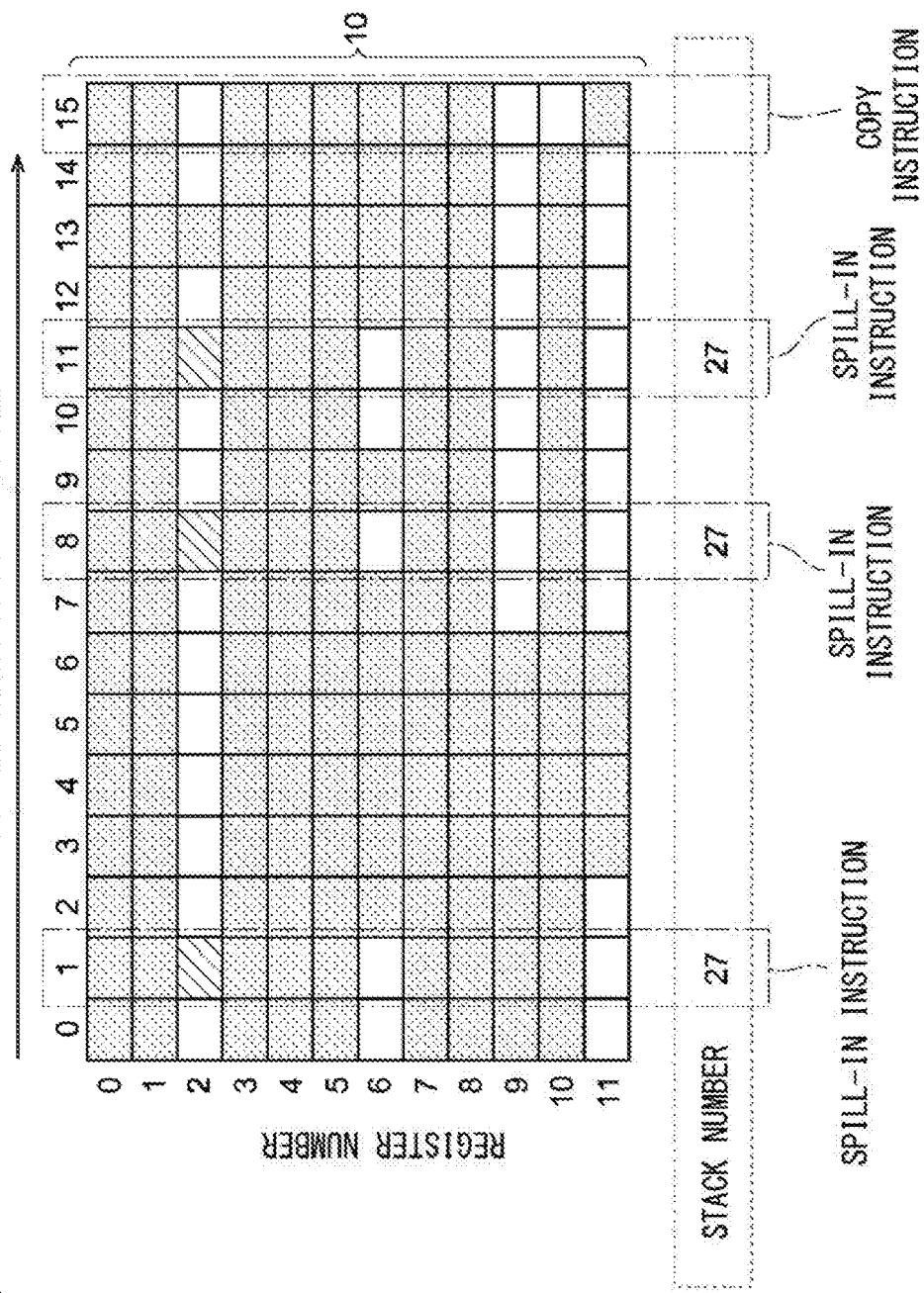
FIG. 15 is a diagram (No. 8) schematically illustrating the overview of the method of changing the register allocations in accordance with the second example of the embodiment.

To avoid this situation, in this example, a copy instruction is added as the last 15th instruction of the basic block 10 as illustrated in FIG. 15. This copy instruction is an instruction to copy the contents of the 10th registers to the 11th register.

The position to which the copy instruction is added is not particularly limited. The copy instruction may be added to any section to which the 11th register, to which the contents of the 10th register is copied, is not allocated. For example, the copy instruction can be added after the 6th instruction.

Figure 16:
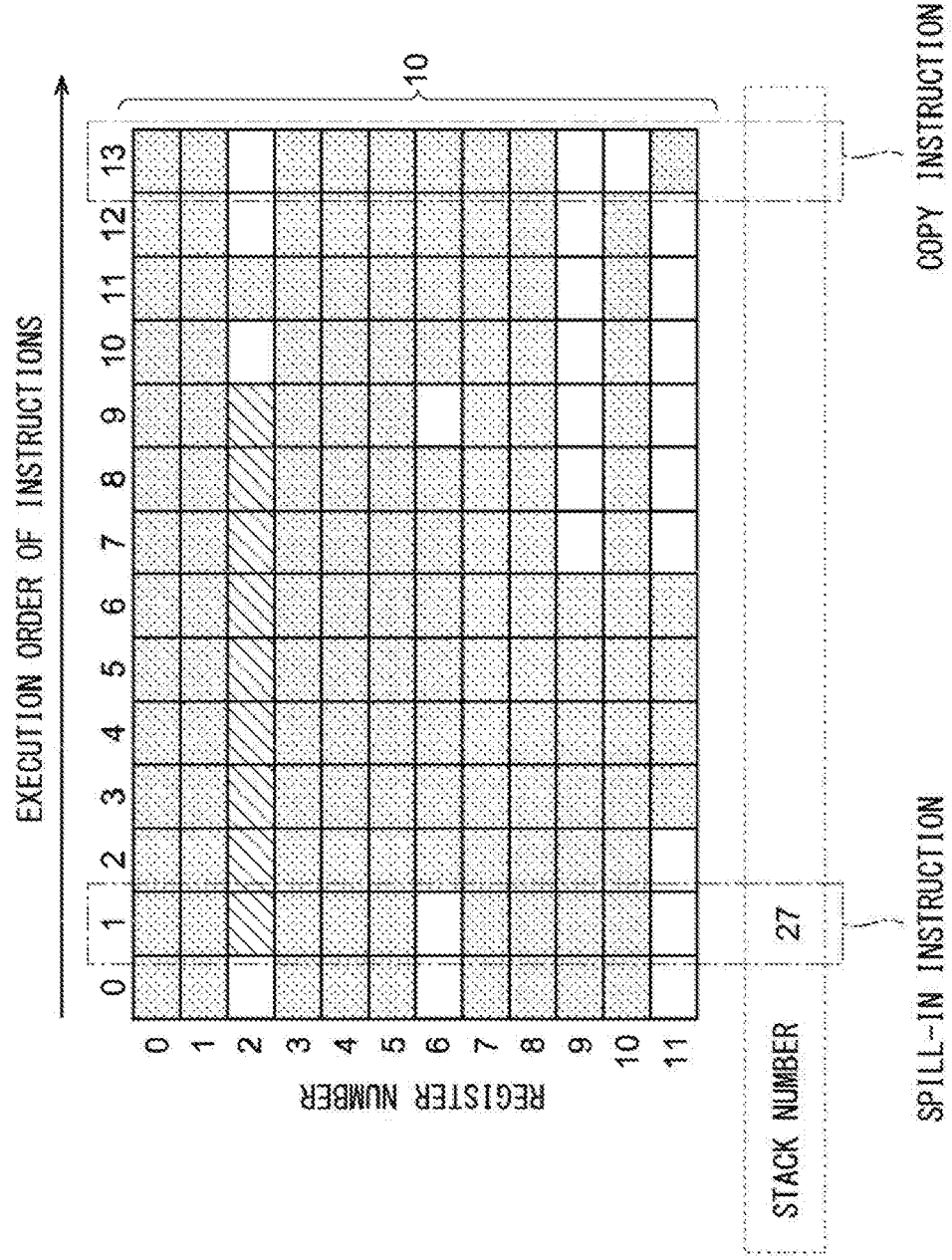
FIG. 16 is a diagram (No. 9) schematically illustrating the overview of the method of changing the register allocations in accordance with the second example of the embodiment.

Thereafter, as illustrated in FIG. 16, unnecessary 8th and 11th spill instructions are deleted. In this state, the aforementioned copy instruction is already added at the end of the basic block 10. Note in FIG. 16 that hatching with slant lines indicates the section in which the data allocated to the 1st spill-in instruction is retained.

Figure 17:
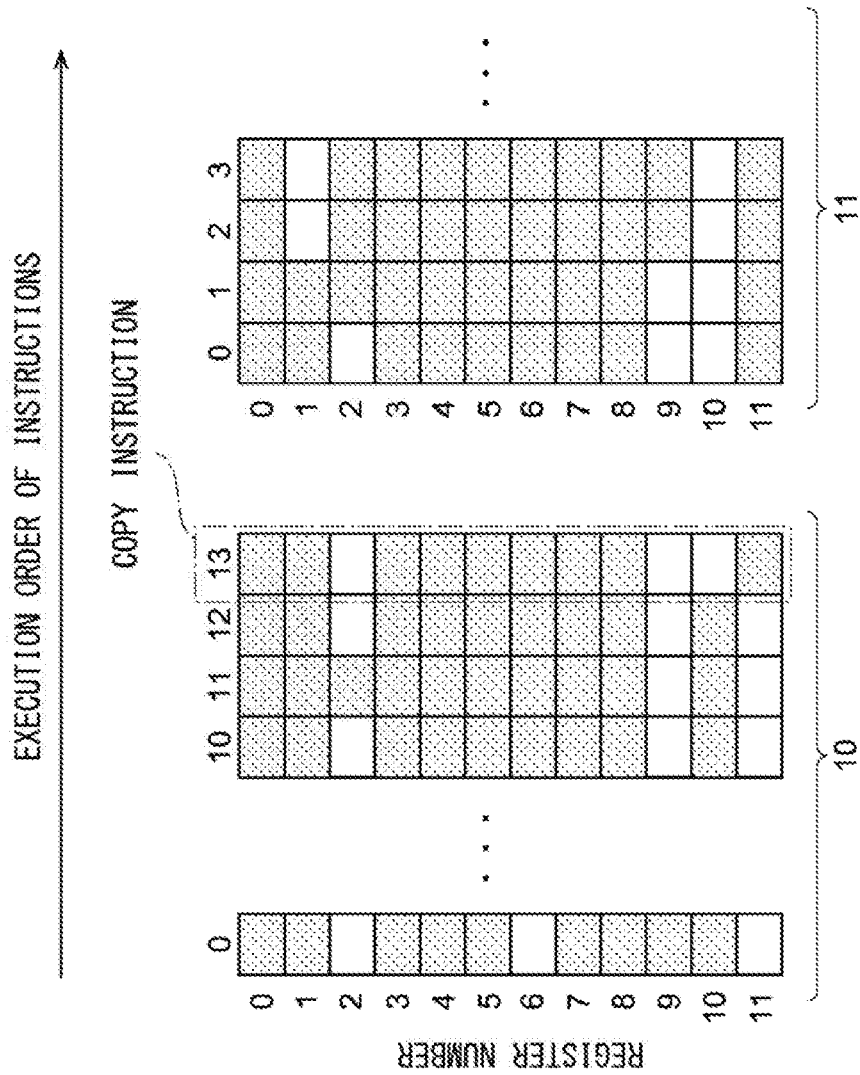
FIG. 17 is a diagram illustrating a relationship between a copy instruction and a subsequent basic block in the second example of the embodiment.

FIG. 17 illustrates a relationship between the copy instruction and the subsequent basic block 11.

As illustrated in FIG. 17, the register allocations to the last 13th instruction of the basic block 10 and the register allocations to the 1st instruction of the basic block 11 become identical by adding the copy instruction. Thus, the 1st instruction of the basic block 11 can use the same contents of the register as the contents before the register allocations are changed, and hence the execution result of the basic block 11 becomes the same as before the register allocations are changed.

In the example described above, the execution speed of the program in the target machine 1 is improved because the number of instructions included in the basic block 10 is decreased by deleting two spill-in instructions as illustrated in FIG. 16. Furthermore, since spill-in instructions that need memory access are deleted, the execution speed of the program is further improved.

Third Example

In the first example and the second example, spill-in instructions are deleted. In the same manner, spill-out instructions can be deleted. This will be described in the following.

FIGS. 18 to 21 illustrate an overview of a method of changing register allocations in accordance with a third example of the present embodiment.

Figure 18:
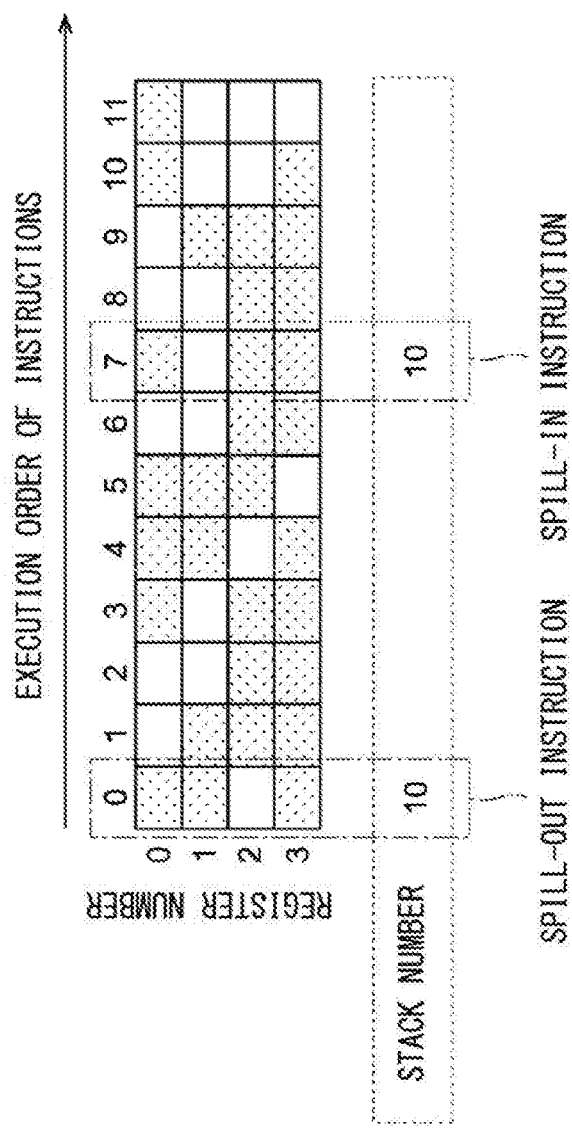
FIG. 18 is a diagram (No. 1) schematically illustrating an overview of a method of changing register allocations in accordance with a third example of the embodiment.

In the example illustrated in FIG. 18, the 0th instruction is a spill-out instruction that transfers the contents of the 0th register to the memory 3. The destination of the transfer is the region having a stuck number of 10 in the memory 3. Moreover, the 7th instruction is a spill-in instruction that transfers data in the region having a stuck number of 10 to the 0th register.

In this case, the 0th register is allocated in the section [3, 5], and spill-out is carried out by the 0th instruction so that the contents of the 0th register is not rewritten in the section [3, 5], and data of the 0th register is saved in the memory 3. Then, after instructions in the section [3, 5] are completed, spill-in is carried out by the 7th instruction to transfer the data saved in the memory 3 to the 0th register again.

Thus, in order to delete the 0th spill-out instruction and the 7th spill-in instruction, the 0th register may be deallocated from the section [3, 5] by changing register allocations using the same process as those of the first and the second examples.

Figure 19:
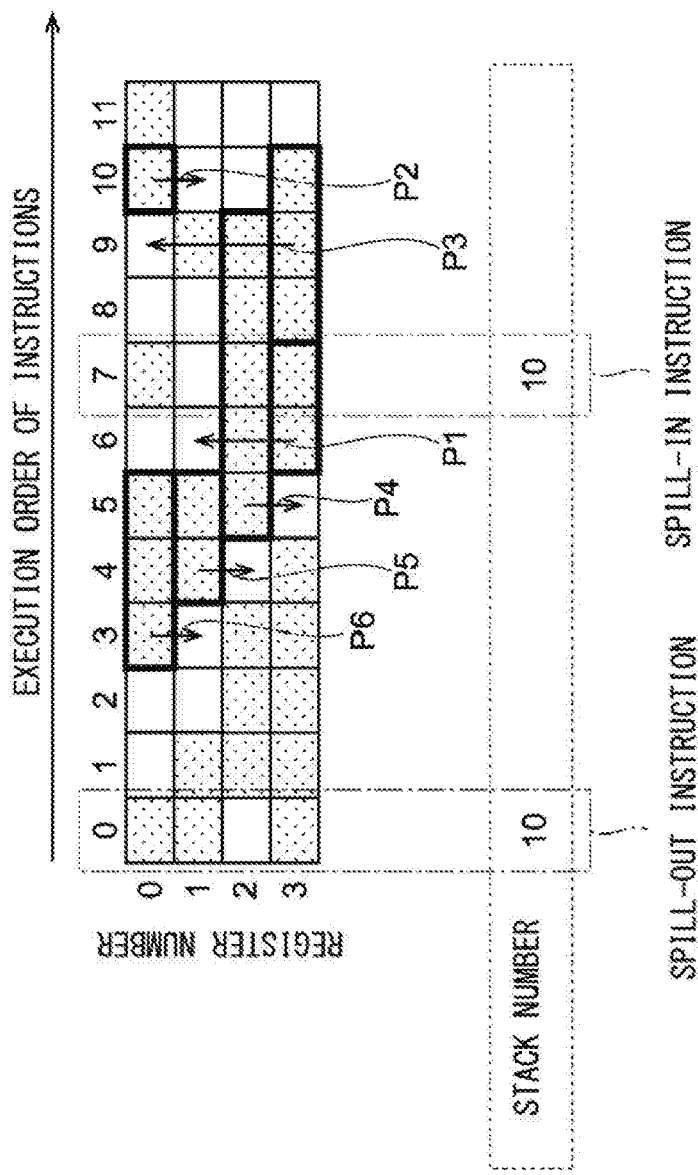
FIG. 19 is a diagram (No. 2) schematically illustrating the overview of the method of changing the register allocations in accordance with the third example of the present embodiment.

In this example, register allocations are changed in the order of steps P1 to P6 in FIG. 19.

Figure 20:
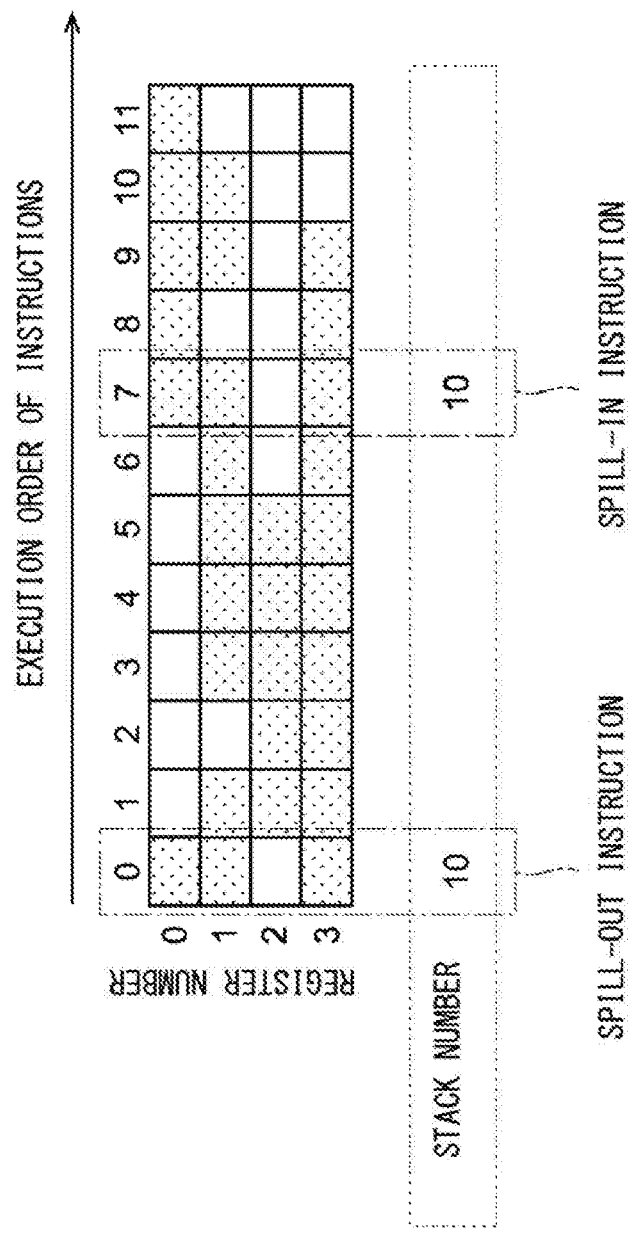
FIG. 20 is a diagram (No. 3) schematically illustrating the overview of the method of changing the register allocations in accordance with the third example of the embodiment.

Thus, as illustrated in FIG. 20, the 0th register is deallocated in the section [1, 6] between the 0th spill-out instruction and the 7th spill-in instruction. Therefore, in the section [1, 6], the contents of the 0th register is not changed. Hence, it becomes unnecessary to save the data of the 0th register in the memory 3 by the 0th spill-out instruction. Furthermore, the 7th spill-in instruction to return the saved data to the 0th register also becomes unnecessary.

Figure 21:
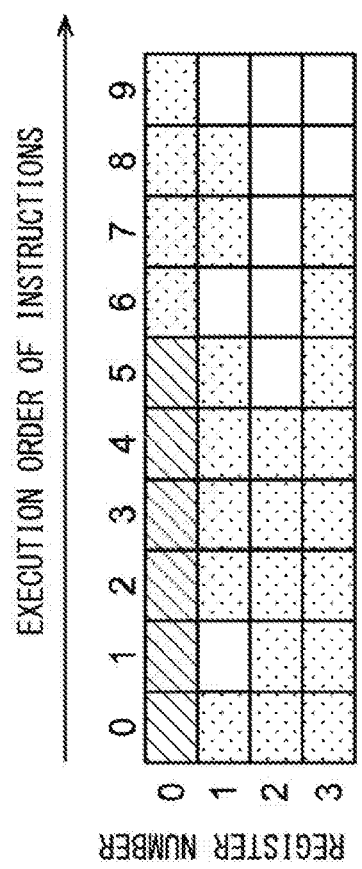
FIG. 21 is a diagram (No. 4) schematically illustrating the overview of the method of changing the register allocations in accordance with the third example of the embodiment.

Thus, as illustrated in FIG. 21, the spill-out instruction and the spill-in instruction are deleted. Thereby, the execution speed of the program is improved as in the first example and the second example described above. Note in FIG. 21 that hatching with slant lines indicates registers that may be newly in use.

Hardware Configuration

Next, a compiler device that is able to change register allocations as in the first through third examples will be described.

Figure 22:
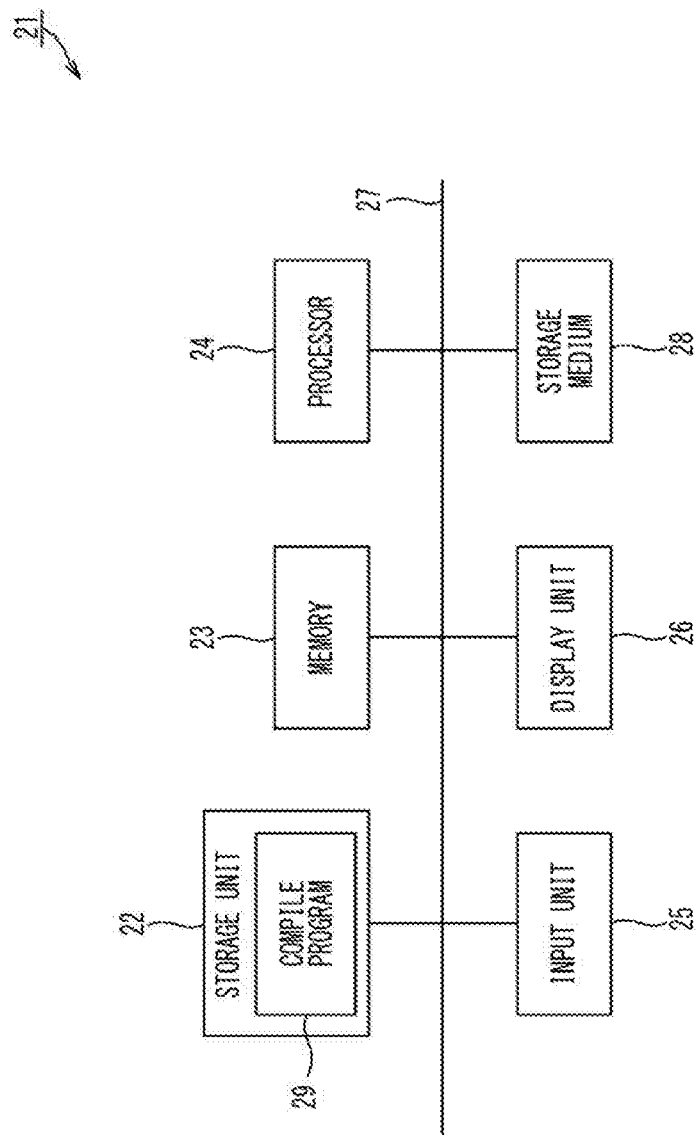
FIG. 22 is a hardware configuration diagram of a compiler device in accordance with the embodiment.

FIG. 22 is a hardware configuration diagram of a compiler device in accordance with the present embodiment.

A compiler device 21 is a computing machinery such as a PC or a server that executes a compile program, and includes a storage unit 22, a memory 23, a processor 24, an input unit 25, and a display unit 26. These units are connected to each other through a bus 27.

The storage unit 22 is a secondary storage device such as, but not limited to, a hard disk drive (HDD) or a solid state drive (SSD), and stores a compile program 29 in accordance with the present embodiment. The compile program 29 is a compiler that changes register allocations in the input instruction sequence and outputs the instruction sequence after the register allocations are changed.

Note that the compile program 29 may be stored in a computer-readable storage medium 28, and the processor 24 may read the compile program 29 stored in the storage medium 28.

Examples of the storage medium 28 include, but are not limited to, physical portable storage media such as a compact disc-read only memory (CD-ROM), a digital versatile disc (DVD), and a universal serial bus (USB) memory. A semiconductor memory such as a flash memory or a hard disk drive may be used as the storage medium 28. These storage medium 28 are not a temporal storage medium such as carrier waves having no physical form.

Furthermore, the compile program 29 may be stored in a device connected to a public network, the Internet, or a local area network (LAN), and the processor 24 may read the compile program 29 and execute the compile program 29.

On the other hand, the memory 23 is a hardware device such as a DRAM that temporarily stores data, and the compile program 29 is loaded onto the memory 23.

The processor 24 is a hardware device such as a central processing unit (CPU) that controls each components of the compiler device and executes the compile program 29 in cooperation with the memory 23.

The input unit 25 is an input device such as, but not limited to, a keyboard and a mouse. When the user operates these input devices, the input and the output of the compile program 29 are designated.

The display unit 26 is a display device such as a liquid crystal display that displays various commands used by the user during execution of the compile program 29. Hereinafter, a case where the compiler device 21 executes the compile program 29 will be described as an example. However, the target machine 1 (see FIG. 1) may execute the compile program 29 to implement the following processes and functions.

Functional Configuration

Figure 23:
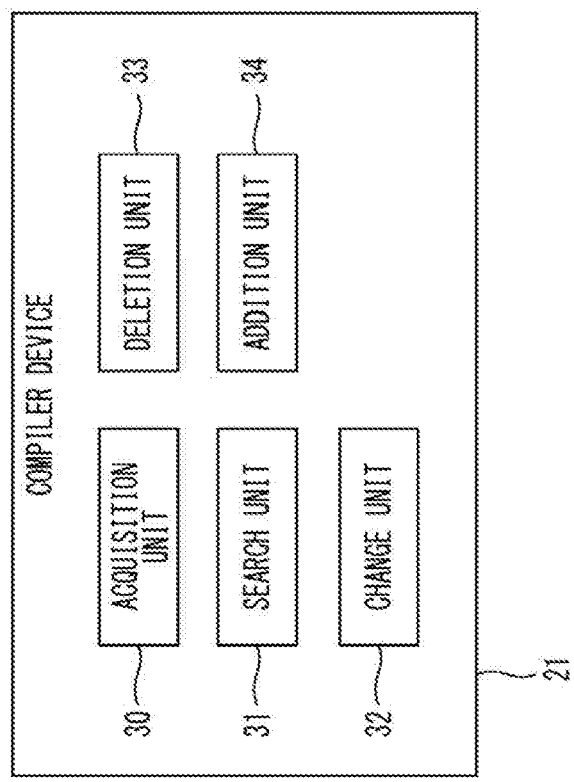
FIG. 23 is a functional block diagram illustrating functions of the compiler device in accordance with the embodiment.

Next, the functional configuration of the compiler device 21 will be described. FIG. 23 is a functional block diagram illustrating functions of the compiler device 21 in accordance with the present embodiment.

The compiler device 21 is a device that accepts input of an instruction sequence and deletes unnecessary spill instructions in the accepted instruction sequence, and includes an acquisition unit 30, a search unit 31, a change unit 32, a deletion unit 33, and an addition unit 34. These units are implemented by executing the compile program 29 by the cooperation between the processor 24 and the memory 23.

The acquisition unit 30 is a functional unit that obtains the instruction sequence generated by another compiler.

The search unit 31 is a functional unit that searches for a candidate of a register that is newly allocated, for the purpose of changing the register allocations in the obtained instruction sequence as illustrated in FIG. 3 and FIG. 8.

For example, as illustrated in FIG. 3, consider the case where the 2nd register is allocated to each of the 1st spill-in instruction and the 11th spill-in instruction, and the 2nd register is allocated to the 3rd instruction between the 1st and 11th instructions. In this case, the search unit 31 searches for a candidate of a register that is newly allocated in the section [3, 3] instead of the 2nd register. The candidate is the 11th register, which is free at the starting point of the section [3, 3] as described above.

Figure 12:
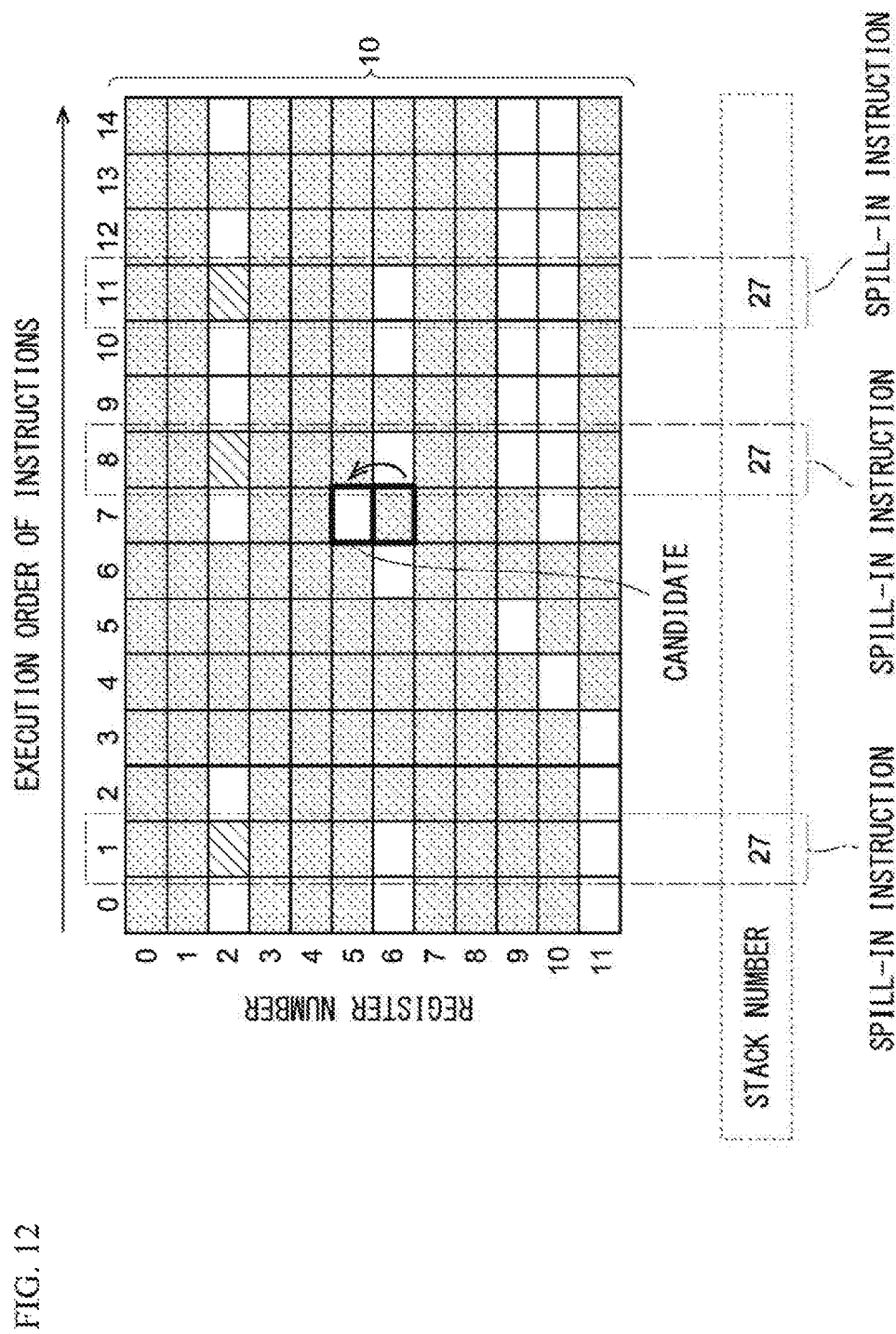
FIG. 12 is a diagram (No. 5) schematically illustrating the overview of the method of changing the register allocations in accordance with the second example of the embodiment.

In addition, in the example illustrated in FIG. 8, the search unit 31 searches for a candidate of a register that is newly allocated in the [3, 6] instead of the 2nd register. The candidate in this case is also the 11th register that is free at the starting point of the section [3, 6]. When the search unit 31 searches for a candidate of a register that is newly allocated, the search is conducted by initially taking it into consideration what register is subjected to the changing of the allocation. For example, in the example illustrated in FIG. 12, the initial purpose is to change the register allocation such that the 2nd register is not allocated in the section [2, 7] and the section [9, 10]. In the example of FIG. 12, the search unit 31 searches for a candidate of newly allocated register in the section [7, 7] instead of the 6th register. The candidate in this case is the 5th register that is free at the starting point of the section [7, 7] except for the 2nd register, because the initial purpose is to change the allocation of the 2nd register in the section [2, 7].

The change unit 32 is a functional unit that changes register allocations. How to change allocations is determined taking into consideration the section to which each register is allocated.

For example, as illustrated FIG. 3, consider the case where 2nd register is allocated to the section [3, 3] before changing the allocation, and 11th register serving as the candidate register is allocated to the section [5, 14]. When the sections [3, 3] and [5, 14] do not overlap as in this case, the allocation in the section [3, 3] is changed from the 2nd register to the 11th register.

On the other hand, as illustrated in FIG. 8, consider the case where the 2nd register is allocated to the section [3, 6] before changing the allocation, and 11th register serving as the candidate register is allocated to the section [4, 14] that overlaps the section [3, 6]. In this case, the change unit 32 changes the allocation in the section [4, 14] from the 11th register to the 10th register by executing steps P1 to P4 as illustrated in FIG. 13. In subsequent step P5, the change unit 32 changes the allocation in the section [3, 6] from the 2nd register to the 11th register.

The deletion unit 33 deletes unnecessary spill instructions after the change unit 32 changes register allocations. In the example of FIG. 6, of the 2nd spill-in instruction and the 11th spill-in instruction, the 11th spill-in instruction that is executed later than the 2nd spill-in instruction becomes unnecessary. Therefore, the deletion unit 33 deletes the 11th spill-in instruction. In addition, the 8th spill-in instruction between the 2nd and 11th instructions are also unnecessary.

Thus, the deletion unit 33 also deletes the 8th spill-in instruction. This is also the case for the example of FIG. 15.

On the other hand, when the 0th spill-out instruction is executed first and the 7th spill-in instruction is executed thereafter as in the example of FIG. 20, both of these spill instructions can be deleted as described above. Thus, in this case, the deletion unit 33 deletes both the spill-out instruction and the spill-in instruction.

The addition unit 34 is a functional unit that adds a copy instruction at the end of the basic block 10 as illustrated in FIG. 13 to FIG. 15. In the example of FIG. 13, the 11th register, to which the allocation is to be changed from the 2nd register, is allocated to the section [4, 14], and extends to the end of the basic block 10. In this case, in order to prevent the execution result of the program from being changed from that before register allocations are changed, the addition unit 34 adds a copy instruction that copies the contents of the 10th register to the 11th register, as illustrated in FIG. 15.

Flowchart

Figure 24:
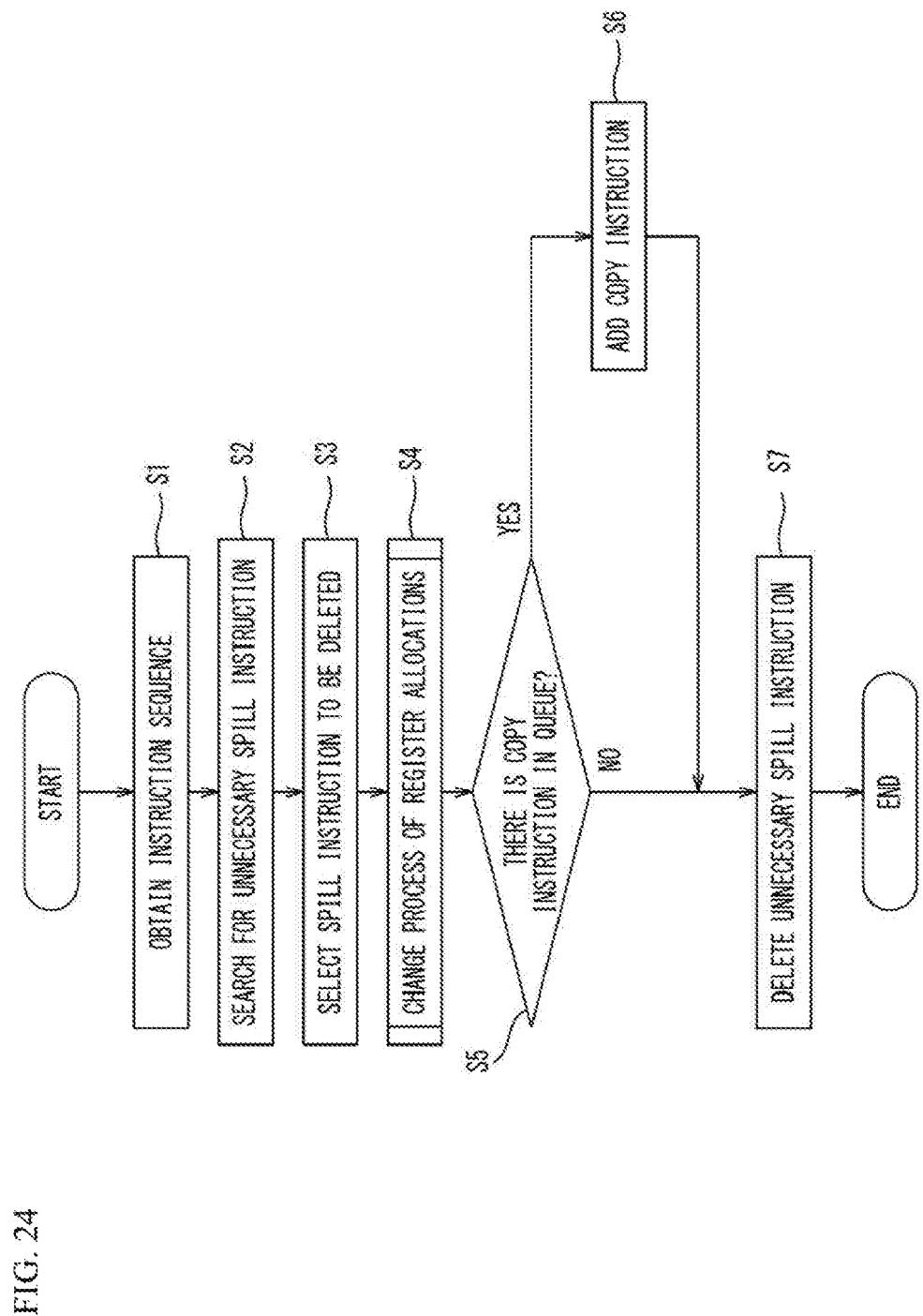
FIG. 24 is a flowchart of an information processing method in accordance with the embodiment.

Next, an information processing method in accordance with the present embodiment will be described. FIG. 24 is a flowchart illustrating the information processing method in accordance with the present embodiment.

First, in step S1, the acquisition unit 30 obtains an instruction sequence generated by another compiler.

Then, in step S2, the search unit 31 searches for a candidate for an unnecessary spill instruction in the obtained instruction sequence. When the basic block 10 has a plurality of spill instructions, spill instructions that refer to data having the same stack number in the memory 3 and to which the same register is allocated are candidates for unnecessary spill instructions. For example, in the example of FIG. 3 and FIG. 8, the 1st, 8th, and 11th spill-in instructions are candidates for unnecessary spill instructions. On the other hand, in the example of FIG. 18, the 0th spill-out instruction and the 7th spill-in instruction are candidates for unnecessary spill instructions.

Based on log information output from another compiler that generated the instruction sequence, the search unit 31 can distinguish the spill instruction from other instructions, and also can obtain the register number allocated to each instruction.

Then, in step S3, the search unit 31 selects a spill instruction to be deleted.

When all of the spill instructions determined to be unnecessary in step S2 are spill-in instructions, all the spill-in instructions excluding the one executed first are to be deleted. For example, in the examples of FIG. 3 and FIG. 8, the 8th and 11th spill-in instructions are selected as spill instructions to be deleted.

Moreover, when a spill-in instruction and a subsequent spill-out instruction are determined to be unnecessary in step S2, both the spill-in instruction and the spill-out instruction are to be deleted. For example, in the example of FIG. 18, both the 0th spill-out instruction and the 7th spill-in instruction are selected as spill instructions to be deleted.

Then, in step S4, the change unit 32 executes a change process of register allocations. Details of the change process will be described later.

Next, in step S5, the addition unit 34 determines whether there is a copy instruction in the queue. The queue is a data structure for queueing the copy instruction described in FIG. 15, and is created in the memory 3 by the addition unit 34. The copy instruction is added to the queue when the register allocation in the section extending to the end of the basic block is changed.

Here, when it is determined that there is a copy instruction in the queue (YES), the process proceeds to step S6.

In step S6, the addition unit 34 adds a copy instruction at the head of the queue to the end of the basic block, so that the execution result of the program does not change between before and after register allocations are changed. Thereafter, the process proceeds to step S7.

On the other hand, when it is determined that there is no copy instruction in the queue in step S5 (NO), the process proceeds to step S7, where the deletion unit 33 deletes the unnecessary spill instruction.

In the examples of FIG. 3 and FIG. 8, the deletion unit 33 deletes the 8th and 11th spill-in instructions. In the example of FIG. 18, the deletion unit 33 deletes the 0th spill-out instruction and the 7th spill-in instruction.

In this manner, the basic steps of the information processing method according to the present embodiment are completed. Thereafter, the instruction sequence of which the spill instructions are deleted is input to another compiler, and the another compiler generates an object file that can be executed in the target machine 1 (see FIG. 1).

Next, the change process of register allocations in step S4 will be described in detail.

Figure 25:
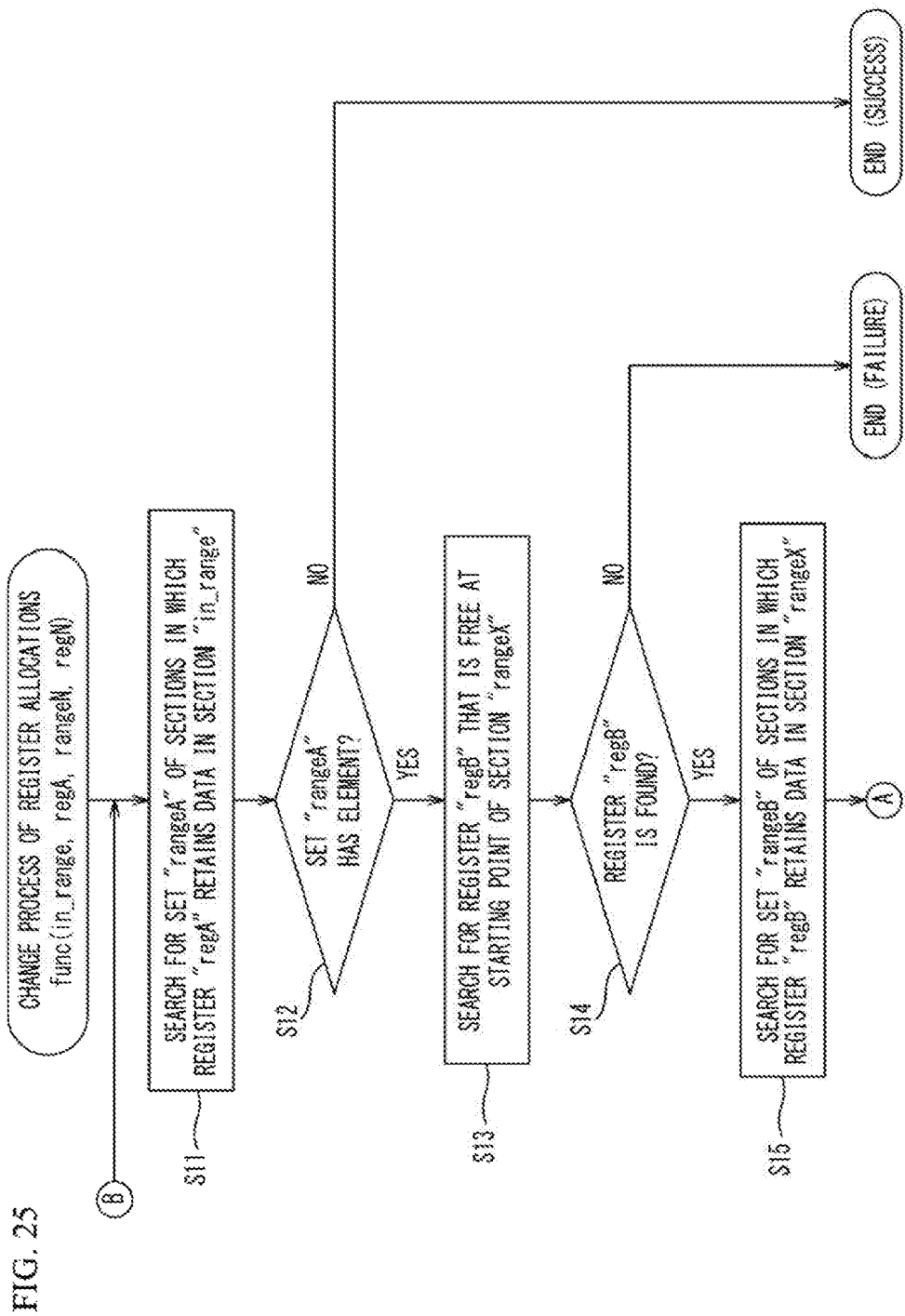
FIG. 25 is a flowchart (No. 1) of a change process of register allocations in accordance with the embodiment.
Figure 26:
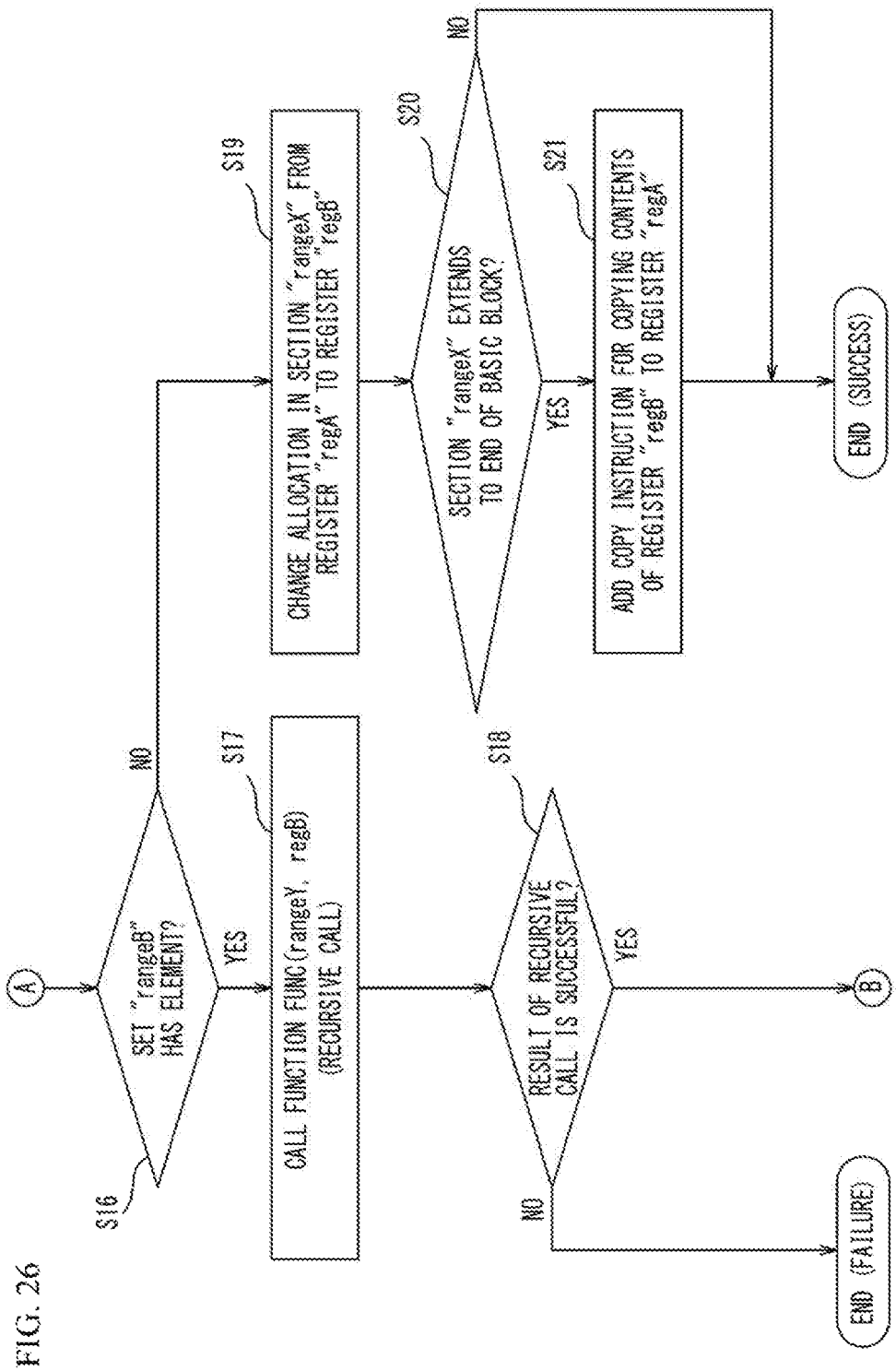
FIG. 26 is a flowchart (No. 2) of the change process of the register allocations in accordance with the embodiment.

FIG. 25 and FIG. 26 are flowcharts illustrating the change process of register allocations in accordance with the present embodiment.

The change process of register allocations is implemented by calling the function func(in_range, regA, rangeN, regN) recursively. Among the arguments of the function func, "in_range" is a variable representing a section. In addition, "regA" is a variable representing the A-th register. Finally, "range N" represents a set of sections that is not subjected to change of the register allocation, and "regN" represents a register that is not subjected to the change of the allocation. Note that when the function func is called for the first time, "in_range" and "rangeN" are set to be identical to each other, and "regA" and "regN" are set to be identical to each other.

Hereinafter, a set of sections in which the register "regA" retains data in the section "in_range" excluding a spill instruction to be deleted in step S3 is represented by "rangeA".

For example, when the equation "in_range=[1, 10]" holds, "rangeA" can be expressed as "rangeA={[1, 1], [2, 5], [7, 8]}". Note that the element of the set "rangeA" is also described as "rangeX". In this example, the equation "rangeX=[1, 1]", "rangeX=[2, 5]", and "rangeX=[7, 8]" hold.

Prior to calling the function func(in_range, regA, rangeN, regN), the search unit 31 sets respective initial values of "in_range", "regA", "rangeN", and "regN". Among these parameters, "in_range" represents the section spanning from the first spill instruction to the last spill instruction. Here, the first and last spill instruction are both candidates for unnecessary spill instructions searched for in step S1. Moreover, when the function func(in_range, regA, rangeN, regN) is called for the first time, the same value is set to "rangeN" and "in_range", and the same value is set to "regN" and "regA". For example, in the examples of FIG. 3 and FIG. 8, in_range=[1, 11] and rangeN=[1, 11]. In the example of FIG. 18, the equations "in_range=[0, 7]" and "rangeN=[0, 7]" hold. Note that the search unit 31 can identify these sections based on the log output from another compiler that generated instruction sequences of FIG. 3 and FIG. 8.

The parameter "regA" represents a register, which is used when each spill instruction selected in step S3 refers to the memory. In the examples of FIG. 3 and FIG. 8, "regA" is the 2nd register that is destination of the data transferred from the memory 3. In contrast, in the example of FIG. 18, "regA" is the 0th register. The 0th register plays the role of a source register from which data is transferred by the 0th spill-out instruction, as well as a destination register to which data is transferred by the 7th spill-in instruction.

Processing details of the function func after initializing in this manner will be described.

First, in step S11, the search unit 31 searches for the "rangeA" representing the set of sections, in which the register "regA" retains data in the section "in_range". For example, in the example of FIG. 8, "in_range"=[1, 11], "regA" is the 2nd register, and "rangeA"={[3, 6]}.

Then, in step S12, the search unit 31 determines whether the set "rangeA" has an element. Here, when it is determined that the set "rangeA" has no element (NO), it follows that the register "regA" does not retain data in the section "in_range", and there is no instruction to which the register "regA" is allocated in the section "in_range". In such a state, as illustrated in FIG. 14, there is no instruction, except for the 8th spill-in instruction, to which the 2nd register is allocated in the section [1, 11]. Thus, even when the register allocation is not changed, the unnecessary 8th and 11th spill-in instructions can be deleted. Therefore, in this case, the register allocations are not changed, and the process ends successfully.

On the other hand, when it is determined that the set "rangeA" has an element in step S12 (YES), it follows that there is an instruction to which the register "regA" is allocated in the section "in_range". For example, in the example of FIG. 8, "rangeA"={[3, 6]} holds as described above. Therefore, it is determined in this example that the set "rangeA" has an element (YES). In this case, since the register allocations need to be changed, the process proceeds to next step S13.

In step S13, the search unit 31 identifies the section "rangeX" whose starting point is the earliest among sections that are the elements of the set "rangeA" searched for in step S11. Then, the search unit 31 searches for the register "regB" that is free at the starting point of the section "rangeX". This search is performed excluding the register "regN" in the set of sections "rangeN". That is, the register regB is searched for such that the starting point of the section "rangeX" is not included in the section "rangeN" and the register "regN" is not identical to the register "regB". The register "regB" is a candidate to which the allocation in the section "rangeX" is to be changed from the register "regA".

In the example of FIG. 8, since the equation "rangeA={[3, 6]}" holds, it follows that the equation "rangeX=[3, 6]" holds. Then, "regB" becomes the 11th register, which is free in the 3rd instruction that is starting point of "rangeX"=[3, 6]. In the example of FIG. 12, the 2nd register is free in the 7th instruction, which is the starting point of "rangeX"=[7, 7]. However, the 7th instruction is included in "rangeN"=[1, 11], and also equation "regN=2" holds. Therefore, the 2nd register is not selected.

Then, in step S14, the search unit 31 determines whether the register "regB" is found. When it is determined that the register "regB" is not found (NO), it is impossible to change the allocation of the register "regA" to the register "regB". Thus, in this case, the process ends with the failure of register allocations.

On the other hand, when it is determined that the register "regB" is found in step S14 (YES), the process proceeds to step S15.

In step S15, the search unit 31 searches for the set rangeB of sections in which the register regB retains data in the section rangeX.

In the example of FIG. 8, equation "rangeX=[3, 6]" holds, and the register "regB" is the 11th register. Therefore, it follows "rangeB={[4, 14]}" holds.

Next, in step S16, the search unit 31 determines whether the set "rangeB" has an element. When it is determined that the set "rangeB" has an element (YES), it is impossible to change the register allocation in the section "rangeX" from the register "regA" to the register "regB" without further changing register allocations. For example, in the example of FIG. 8, it is impossible to change the register allocation in the section [3, 6] from the 2nd register to the 11th register.

In this case, the process proceeds to step S17, where the search unit 31 identifies the section "rangeY" whose starting point is the earliest among the sections contained in the set "rangeB". Then, the search unit 31 performs recursive call for calling the function func(rangeY, regB, rangeN, regN).

For example, in the example of FIG. 8, since "rangeB={[4, 14]}" holds, it follows that "rangeY=[4, 14]" holds.

Thereafter, in step S18, the search unit 31 determines whether the result of the recursive call is successful, and when it is determined that the result of the recursive call is successful (YES), the process is re-executed from step S11. When it is determined that the result of the recursive call is not successful (NO), the process end with the failure of register allocations.

On the other hand, when it is determined that the set "rangeB" has no element in step S16 (NO), it follows that there is no instruction to which the register "regB" is allocated in the section "rangeX". For example, in the example of FIG. 12, "rangeX=[7, 7]" holds and "regB" is the 5th register. Thus, it follows that "rangeB=11" holds, and there is no instruction to which the 5th register is allocated in the section [7, 7].

In this case, the process proceeds to step S19, where the change unit 32 changes the register allocation in the section "rangeX" from the register "regA" to the register "regB". For example, in the example of FIG. 13, consider the case where "rangeX=[7, 7]" holds, "regA" is the 6th register, and "regB" is the 5th register. In this case, the change unit 32 changes the register allocation in the section [7, 7] from the 6th register to the 5th register.

Next, in step S20, the addition unit 34 determines whether the section "rangeX" extends to the end of the basic block. For example, in the example of FIG. 13, when "rangeX=[4, 14]" holds, it is determined that the section "rangeX" extends to the end of the basic block.

When it is determined that the section "rangeX" extends to the end of the basic block (YES) in this manner, the process proceeds to step S21, where the addition unit 34 adds a copy instruction for copying the contents of the register regB to the register regA to the queue in the memory 3. For example, in the example of FIG. 13, consider the case where "rangeX=[4, 14]" holds, "regA" is the 11th register, and "regB" is the 10th register. In this case, addition unit 34 adds a copy instruction, which copies the contents of the 10th register to the 11th register, to the queue.

When it is determined that the section "rangeX" does not extend to the end of the basic block in step S20 (NO), the process ends without adding a copy instruction to the queue. In this manner, the basic steps of the change process of register allocations according to the present embodiment are completed.

In the present embodiment described above, the change unit 32 creates a register that is free in the section between spill instructions by executing the change process of the register allocations in step S4 in FIG. 24. Therefore, the deletion unit 33 can deletes unnecessary spill instructions in step S7. Accordingly, the number of instructions included in the program can be reduced, and the number of times of memory access during program execution is reduced, which in turn improves the execution speed of the program.

The exemplary embodiment has been described above in detail, but the embodiment is not limited to the above-described embodiment. For example, in FIG. 25 and FIG. 26, the register allocations are changed by recursively calling the function func, but the register allocations may be changed by loop processing without performing the recursive call of the function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An information processing method implemented by a computer, the information processing method comprising:
   obtaining an instruction sequence including a first spill instruction and a second spill instruction that is executed later than the first spill instruction, where the first spill instruction and the second spill instruction refer to same data in a memory, a first register is allocated to each of the first spill instruction and the second spill instruction, and the first register is allocated to a first section between the first spill instruction and the second spill instruction;
   searching for a second register that is a candidate allocated to the first section instead of the first register;
   allocating the second register to the first section instead of the first register when the first section and a second section to which the second register is allocated in the instruction sequence do not overlap;
   after allocating a third register to the second section instead of the second register, allocating the second register to the first section instead of the first register when the first section and the second section overlap; and
   after allocating the second register to the first section instead of the first register, deleting the second spill instruction.

2. A compiler device comprising:
   a first memory; and
   a processor coupled to the first memory and configured to:
      obtain an instruction sequence including a first spill instruction and a second spill instruction that is executed later than the first spill instruction, where the first spill instruction and the second spill instruction refer to same data in a second memory;
      when a first register is allocated to the first spill instruction and the second spill instruction, and the first register is allocated to a first section between the first spill instruction and the second spill instruction, search for a second register that is a candidate allocated to the first section instead of the first register;

allocate the second register to the first section instead of the first register when the first section and a second section to which the second register is allocated in the instruction sequence do not overlap;

after allocating a third register to the second section instead of the second register, allocate the second register to the first section instead of the first register when the first section and the second section overlap; and after allocating the second register to the first section instead of the first register, delete the second spill instruction.

3. The compiler device according to claim 2, wherein the processor is configured to delete both the first spill instruction and the second spill instruction, when the first spill instruction is a spill-out instruction and the second spill instruction is a spill-in instruction.

4. The compiler device according to claim 2, wherein the first spill instruction and the second spill instruction are spill-in instructions.

5. The compiler device according to claim 2, wherein the instruction sequence is in a basic block, and the processor is configured to, when the second section extends to an end of the basic block, add a copy instruction for copying a content of the third register to the second register after the second spill instruction.

6. A non-transitory computer-readable storage medium storing a program causing a computer to execute a process, the process comprising:

obtaining an instruction sequence including a first spill instruction and a second spill instruction that is executed later than the first spill instruction, where the first spill instruction and the second spill instruction refer to same data in a memory;

when a first register is allocated to each of the first spill instruction and the second spill instruction, and the first register is allocated to a first section between the first spill instruction and the second spill instruction, searching for a second register that is a candidate allocated to the first section instead of the first register;

allocating the second register to the first section instead of the first register when the first section and a second section to which the second register is allocated in the instruction sequence do not overlap;

after allocating a third register to the second section instead of the second register, allocating the second register to the first section instead of the first register when the first section and the second section overlap; and after allocating the second register to the first section instead of the first register, deleting the second spill instruction.

* * * * *